United States Patent
Altamura et al.

(10) Patent No.: US 9,655,211 B2
(45) Date of Patent: May 16, 2017

(54) LIGHTING

(71) Applicant: Seasonal Specialties, LLC, Eden Prairie, MN (US)

(72) Inventors: Steven J. Altamura, Scarsdale, NY (US); Christine Werner, St. Louis Park, MN (US); Derek Dean Anderson, Blaine, MN (US); Matthew Guse, Waconia, MN (US); Carmen Miller, Excelsior, MN (US)

(73) Assignee: Seasonal Specialties, LLC, Eden Prairie, MN (US)

( * ) Notice: Subject to any disclaimer, the term of this patent is extended or adjusted under 35 U.S.C. 154(b) by 82 days.

(21) Appl. No.: 14/516,327

(22) Filed: Oct. 16, 2014

(65) Prior Publication Data

US 2015/0102731 A1 Apr. 16, 2015

Related U.S. Application Data

(63) Continuation-in-part of application No. 14/493,577, filed on Sep. 23, 2014, now Pat. No. 9,491,826.
(Continued)

(51) Int. Cl.
*H05B 33/08* (2006.01)
*H05B 37/02* (2006.01)
(Continued)

(52) U.S. Cl.
CPC ..... *H05B 37/0272* (2013.01); *A47G 33/0836* (2013.01); *F21S 4/10* (2016.01); *F21V 23/003* (2013.01); *F21V 23/045* (2013.01); *F21V 23/0471* (2013.01); *F21V 23/0478* (2013.01); *F21V 23/06* (2013.01); *G06F 3/048* (2013.01); *G08C 17/02* (2013.01); *H05B 33/0821* (2013.01); *H05B 33/0845* (2013.01); *H05B 33/0863* (2013.01); *H05B 33/0872* (2013.01); *H05B 37/0227* (2013.01);
(Continued)

(58) Field of Classification Search
None
See application file for complete search history.

(56) References Cited

U.S. PATENT DOCUMENTS 6,016,038 A 1/2000 Mueller
6,608,453 B2 * 8/2003 Morgan .................. G09G 3/14
315/297
(Continued)

FOREIGN PATENT DOCUMENTS

WO WO 2005/084339 9/2005

*Primary Examiner* — Douglas W Owens
*Assistant Examiner* — James H Cho
(74) *Attorney, Agent, or Firm* — Altera Law Group, LLC

(57) ABSTRACT

Enhancements to ornamental or holiday lighting are disclosed including remote control ornamental illumination with color pallet control whereby a user can vary the color/intensity/appearance of an individual bulb or entire light string by selecting the electronic address of the bulb and selecting its attribute. Further disclosures include: motion responsive lights which respond to sensed movement, gesture controlled lights, adjustable white color/white led sets, connectable multi-function lights, controller to sequence lights to music or other input source, rotating projection led light/tree top/table top unit, and remote controlled sequencing icicle lights and ornament lighting system.

11 Claims, 26 Drawing Sheets

Related U.S. Application Data

(60) Provisional application No. 61/881,004, filed on Sep. 23, 2013.

(51) Int. Cl.
*F21V 23/00* (2015.01)
*F21V 23/04* (2006.01)
*F21V 23/06* (2006.01)
*F21S 4/10* (2016.01)
*G06F 3/048* (2013.01)
*G08C 17/02* (2006.01)
*F21W 121/00* (2006.01)
*F21W 121/04* (2006.01)
*A47G 33/08* (2006.01)
*F21Y 101/00* (2016.01)

(52) U.S. Cl.
CPC ...... *A47G 33/08* (2013.01); *A47G 2033/0827* (2013.01); *F21W 2121/00* (2013.01); *F21W 2121/04* (2013.01); *F21Y 2101/00* (2013.01); *G08C 2201/30* (2013.01)

(56) References Cited

U.S. PATENT DOCUMENTS

| | | |
|---|---|---|
| 6,788,011 B2 | 9/2004 | Mueller |
| 6,806,659 B1 | 10/2004 | Mueller |
| 7,242,152 B2 | 7/2007 | Dowling et al. |
| 7,809,448 B2 | 10/2010 | Lys et al. |
| 7,961,113 B2 | 6/2011 | Rabiner et al. |
| 8,400,061 B2 * | 3/2013 | Kuang ............... B60Q 3/0259 315/291 |
| 8,553,235 B1 | 10/2013 | Lee |
| 9,497,819 B2 | 11/2016 | Van De Sluis et al. |
| 2012/0323394 A1 * | 12/2012 | Gandhi ............. H05B 33/0857 700/297 |
| 2015/0181680 A1 * | 6/2015 | Wang ............... H05B 37/0227 315/294 |

* cited by examiner

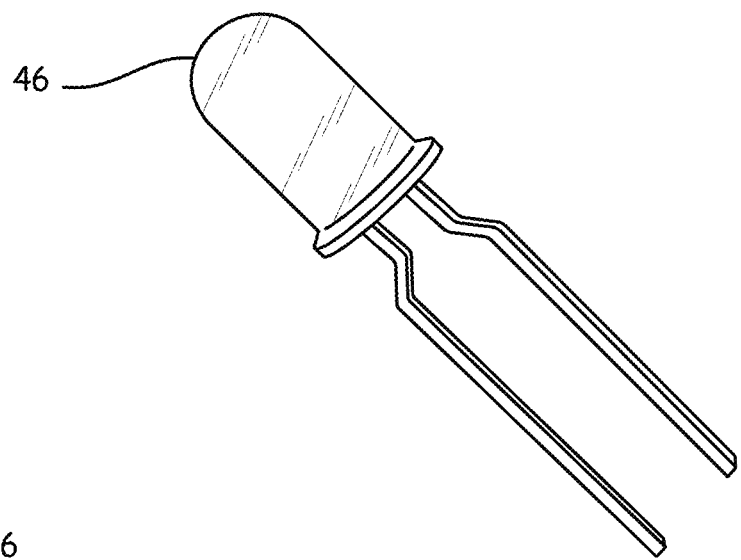
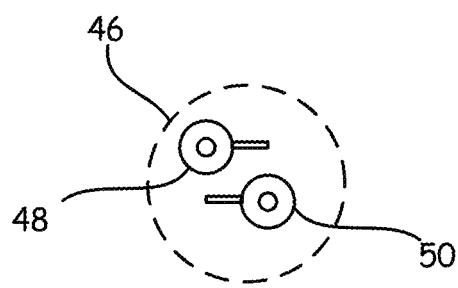
Fig. 16
Fig. 17
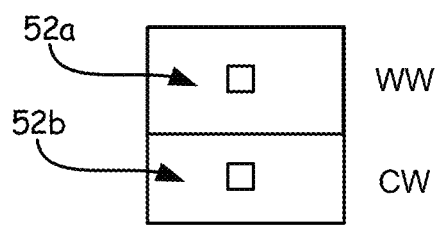
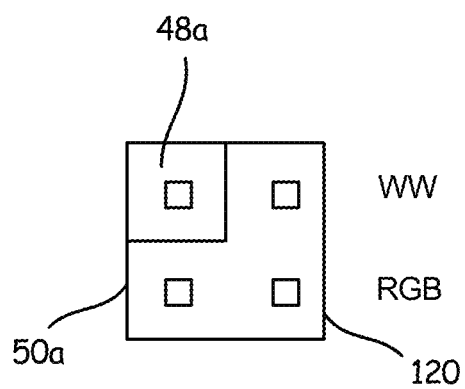
Fig. 18
Fig. 19

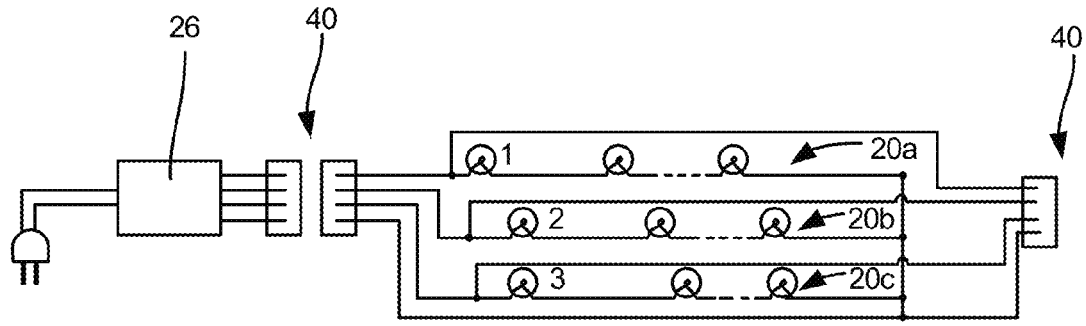
Fig. 33
Fig. 34
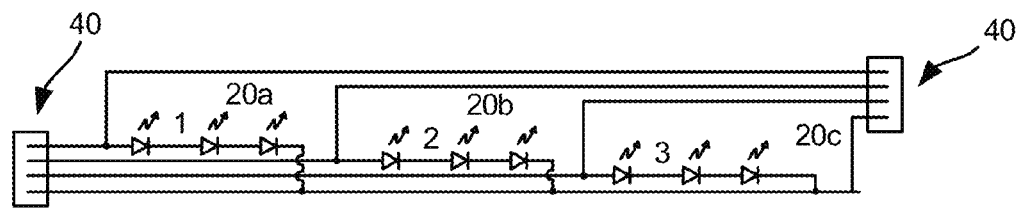
Fig. 35
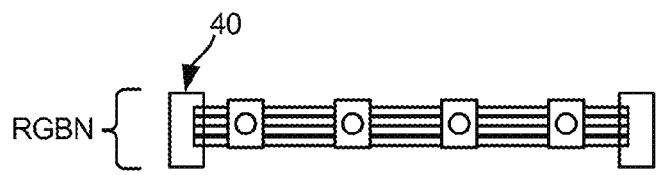
Fig. 36
Fig. 37

LIGHTING

CROSS-REFERENCE TO RELATED APPLICATIONS

This application is a Continuation-In-Part of U.S. patent application Ser. No. 14/493,577 filed 23 Sep. 2014, now U.S. Pat. No. 9,491,626 which claims priority to provisional application Ser. No. 61/881,004 filed 23 Sep. 2013 is hereby incorporated by reference in its entirely.

BACKGROUND OF THE DISCLOSURE

Field of the Disclosure

The present disclosure is directed improvement in ornamental or holiday lighting.

Background

Traditional ornamental lighting concepts have involved the use of strings of lights (LED or incandescent) connected in series, parallel, or series parallel. The lights may be directly connected through a connector, in-line control boxes to cause them to flash, twinkle or other sequential illumination. These selections are static and not in any way influenced by their environment.

The specification below specifies a number of inventive ways to improve lighting effects.

SUMMARY

This summary is intended to assist the reader in understanding the full disclosure and is not a limitation on the claims. The summary also forms part of the disclosure itself. It will also be appreciated that all of the device/system disclosures can be practiced as method of operation and manufacture and vice versa.

In one embodiment there is disclosed a system for configuring the display of lights in a light string having any or all of the following:
  a. a plurality of lamps wired into a string of lights, a lamp may include a plurality of illumination elements like LEDs;
  b. each of said strings having at least one address and a processor controller for responding to commands sent to that address, it is also possible that each lamp or each illumination element may have its own address and processor capability to communicate with that address;
  c. a controller connected to said string to provide power and address signals thereto, this element can also be incorporated in the lamp itself;
  d. a device wirelessly connected to said controller for transmitting commands to said controller, likewise, a wired version of this is contemplated;
  e. said device including a display screen and running software including:
    i. a display including a visual indication said light strings and the count of lamps connected thereto;
    ii. a touch or other responsive (such as motion) interface for accessing each of said displayed strings;
    iii. in response to access of a displayed strings, displaying a color pallet for assigning a color/hue to said string (or individual lighting elements);
    iv. a transmitter for transmitting said selected color from said device to said controller and to said string or lamp by address;
    v. in response to access of a displayed strings or lamps, displaying a selection of non-color light display characteristics assignable to said string, a non-color characteristic includes anything about the illumination element which is not its color, such as intensity or on/off state (flashing rate, on off ramp rate, shimmer, changing/transitioning from one color to the next, etc.).
    vi. a transmitter for transmitting said selected display characteristics from said device to said controller and to said string or lamp by address, so that when said strings of lights are illuminated, they will display whatever color and non color characteristics have been transmitted to them from said device.

The embodiment may also include motion sensing controls, which may be touch or touchless motions on said device for hands free control thereof.

The embodiment may also include motions of any or all of the following and equivalents on the screen or in the air:
  a. pinching fingers to dim lights;
  b. spreading fingers to brighten lights;
  c. tapping to turn on or off;
  d. flicking finger left to right or vice versa to change function;
  e. moving hand towards sensor to turn on or off;
  f. moving hand left to right or right to left over sensor.

The embodiment may also include an input in said controller for audio files, or a microphone for ambient sound input and wherein said color and non-color characteristics of said lamps or strings are modulated in response to said audio file. It is contemplated that the frequency and or amplitude of the sound input can be split into several bands and configured to control only one or some of the light strings. So for example, sounds over 11 khz could control string 1 while sounds under 11 khz could control only string 2, so that the light+sound would appear to be displayed in different locations on the string, much as an orchestra has instruments in different parts of the stage.

The embodiment may also include individual addressable bulbs and wherein color and non color characteristics of each bulb may be selected, displayed and transmitted to the bulbs.

The embodiment may also include non color characteristics of any or all of the following: flashing, fading, jumping.

The embodiment may also include assigned color being saved to a color matrix on a display, which copies the selected color and displays it in the sequence in which it will be applied to the string/lamp. The screen may be capable of saving multiple colors there on. Also possible is user selectability of a non-color transitional characteristics between each color transition so that when the colors and non-color characteristics are selected and transmitted to the addressed strings, they will display a sequence of previously saved colors and non-color transition characteristics between colors, for example a characteristic that has previously been user defined.

The embodiment may also include having the device configured to save a plurality of color matrices and non color transitional characteristics and wherein the user may select from said saved matrices to be transmitted to said controller.

The embodiment may also include a plurality preprogrammed color and non color characteristics stored on the device for user selection.

The embodiment may also include a virtual presentation of lamps corresponding to lamps on said strings and wherein said selected color and non color characteristics are virtually displayed on said screen before transmission to said controller. In other words, after programming the color and/or non color characteristics, the display includes a plurality of lamps which display how the programmed lamps will change color/non color characteristics when applied to the actual screen. If the user finds that the displayed lamps characteristics are not right, he/she can tap on that lamp and change the color or non-color characteristics, lamp by lamp or string by string and then save the result for reuse.

The embodiment may also include a receiver in said display unit for receiving polling information from said controller to determine which strings have reachable addresses. In order to know if the lamps/strings are present and functioning and available for programming, the unit communicates with the strings/lamps to receive a response from all addressable elements. These elements will then appear on the display unit as available for programming.

The embodiment may also include a function to replicating the color and non-color characteristics of one string to another.

In another embodiment, an ornamental lighting system is disclosed which has any or all of the following:
  a. a plurality of end to end connected slave light strings each containing a plurality of lamps, a string may have one or more lamps;
  b. a power supply connectable at one end of said slave strings (such as a 120 v outlet or low voltage adaptor), though it can be connected midstream or elsewhere;
  c. each of said strings being connected to a proximity sensor, said senor configured to initiate a response in the lamps in said string, said response being any or all of the following:
    i. change the illumination color of said lamps responsive to that sensor;
    ii. change the illumination intensity of said lamps responsive to that sensor;
    iii. modulate non color characteristics such as the intensity of lamps, flash rate, ramp rate, etc.

The effect will be that as an object approaches the sensor, the lamps connected to the sensor will initiate the predetermined effect, such as shimmer, change color, change brightness/dim etc. In the case where there are many sensors or one sensor controlling one lamp, the effect will be even more dramatic by giving the illuminated object the sense that it is able to "feel" the approaching object by responding only proximate the sensors triggered. The triggered light may also move in groups or blocks of lights.

In another embodiment, lamps within a string include a sensor capable of controlling its associated lamp and wherein said lamps individually respond to an object which triggers sensors so that lamps adjacent triggered sensors produce a life-responsive effect.

In another embodiment, sensors produce different output signals depending on the proximity of an object and cause different changes in their associated lamps as the object approaches the sensor and triggers different signals. So, for example, an object approaching at 2 meters could increase light intensity, but at 1 meter, could also add a non-color characteristic such as shimmer (rapid dim/brighten).

In another embodiment, different changes include a Doppler color shift in the associated lamp, corresponding to an object approaching or receding from the sensor. So for example, as an object approaches the sensor, the colors would shift either toward higher or lower color frequency and do the opposite as the object withdrew. In addition to the Doppler effect, any non color effect can also be used in response to approach/withdraw of an object, such as shimmer or flash rate, increasing on approach decreasing on withdrawal; intensity increasing on approach, decreasing on withdrawal, etc.

In another embodiment, an ornamental lighting system is disclosed with a plurality of connected LED lamps, a method of controlling color temperature having:
  a. on at least one lamp, locating a warm white LED adjacent to a cool what LED, color temperatures for warm and cool are generally accepted in the industry but this disclosure also considers warm/cool as relative temperatures to each other;
  b. varying the apparent intensity of one of said LEDs relative to each other by any or all of the following:
    i. increasing the actual light intensity of one LED relative to the other until the desired color temperature is perceived, this can be done by increasing voltage or current or by increasing the on-time percentage relative to the other lamp;
    ii. increasing the on-time of one LED relative to the other until the desired color temperature is perceived;
    iii. ramping up the intensity of one LED while ramping down the other LED relative thereto, until the desired color temperature is perceived;
    iv. flashing one LED with a longer on-time than the other LED until the desired color temperature is perceived;
    v. flashing one LED while maintaining the other LED constantly on so and adjusting the flashing rate of said one LED until the desired color temperature is perceived; and the result is that the pair of elements together are perceived as one with an amalgamated color temp.

Also disclosed is a color temperature adjustable ornamental lighting system having one or more of the following elements:
  a plurality of lamps wired in a string of lamps;
  each lamp containing a cool white LED chip and a warm white LED chip adjacent thereto,
  each of said chips being controllable by an individual address; a processor associated with each address, for controlling the flow of power to said chips;
  a remotely controlled wireless device with a display screen,
  a polling algorithm for detecting the presence of lamps by their address and displaying a representation of said lamps on said screen;
  a touch responsive or other form of response selector configured to allow user control of each addressed lamp;
  a touch responsive or other form of response control for varying an illumination parameter of one of the LEDs relative to the other, so that the color temperature represented on the display can be adjusted to user preference;
  a transmission link for transmitting said use preference color temperature to said lamps which are selected;
  so that the user can select the color temperature of one or all lamps.

Also disclosed is an ambient light sensor for measuring ambient light before illumination of the lamps and further matching the illumination of the LEDs to reproduce said ambient color temperature. The ambient light sensor can be a distance from the light string or adjacent thereto. If adjacent, then the sensor takes the measurement before the fixture (tree, luminare or other decorative display) is illuminated so that the LEDs do not affect the measurement.

Also disclosed is a verifying sensor proximate the ambient sensor for comparison of the color temperature of the LED output to the ambient color temperature. The verifying sensor can be adjacent the LEDs since it is intended to measure the color temperature of the LEDs and then the output thereof is compared to the output of the ambient sensor. If it is different, then the color temperature of the LEDs is reset to the ambient value. This can of course occur as ambient light during the day changes because of sunlight changes or changes in other room lighting (candles, room lights etc.).

Also disclosed, is a system wherein the verifying sensor is configured to periodically compare the color temperature of the LEDs with the ambient sensor to maintain matched color temperature between the two.

Also disclosed is a system wherein the verifying sensor is configured to periodically compare the color temperature of the LEDs with a previously obtaining reading from the ambient sensor to maintain matched color temperature between the two and prevent color drift as the LEDs age. Over time, the LED color temperature may drift, either quickly from heat, or slowly from age. This system is configured to self-calibrate back to the original sensor data. Also disclosed is a color temperature adjustable ornamental lighting system having one or more of the following elements:
  a plurality of lamps wired in a string of lamps
  each lamp containing a three color RGB LED chip and a white LED chip adjacent thereto,
  each of said chips being controllable by an individual address; a processor associated with each address, for controlling the flow of power to said chips;
  a remotely controlled wireless device with a display screen,
  a polling algorithm for detecting the presence of lamps by their address and displaying a representation of said lamps on said screen,
  a touch responsive selector configured to allow user control of each addressed lamp,
  a touch responsive control for varying the color balance of the RGB chip to achieve a user desired color,
  a touch responsive control for varying the intensity of the white LED relative to the RGB LED to allow the user to achieve an overall designed color balance and temperature resulting from the mixing of RGB color and while light;
  a transmission link for transmitting said use preference color temperature to said lamps which are selected;
so that the user can select the color and temperature of one or all lamps.

Also disclosed is a system wherein the white LED is a warm white LED or the while LED is a cool white.

Also disclosed is an ornamental lighting string having any or all of the following elements:
  a. a plurality of end to end connected slave light strings each containing a plurality of lamps;
  b. a power supply connectable at one end of said slave strings, said power supply providing an output voltage in excess of the required voltage to power each of said slave light strings;
  c. within each slave light string a voltage regulator for receiving and controlling input voltage to the lamps in each slave string.

The preferred construction is string in parallel, but even so, there are voltage losses which can be accommodated by providing an input voltage which is substantially higher than the voltage needed at the string level.

Also disclosed is a method of illuminating a predetermined light pattern on a grid of light strings having spaced part lamps. In this case, the strings form a grid of vertical and horizontal points of light. By actuating certain lights, preferably from an app with a virtual display thereof, patterns or letter can be spelled out.

Also disclosed is a method of controlling illumination color temperature, of at least one light any or all of the following:
  a. using a color sensor to copy/detect the color of a sensed object;
  b. converting the detected color information into a digital signal comprising RBG color intensities;
  c. transmitting the color information to at least one addressable or non-addressable light or string of lights;
  d. illuminating the light, or string of lights at a color temperature or hue corresponding to the detected color temperature or hue. It is also possible that each bulb in the string is separately addressable.

In another embodiment, an ornamental lighting system is disclosed which does not require sophisticated addressable bulbs or strings. Instead it uses a wiring system having:
  a. a plurality of end to end connected slave light strings each containing a plurality of lamps;
  b. a controller and power supply connectable at one end (or elsewhere) of said slave strings for independently controlling each of said strings;
  c. said strings including a plurality of conductors according to the number of strings connected according to the following formula:

$N = NS + 1$, wherein N is the number of required conductors from the controller to the last string, NS=number of strings connected end to end.

This can also be done with RGB lamps having:
  a. a plurality of end to end connected slave light strings each containing a plurality of three element RGB lamps;
  b. a controller and power supply connectable at one end (or elsewhere) of said slave strings for independently controlling each of said strings by color:
  c. Said strings including a plurality of conductors according to the number of strings connected according to the following formula:

$N = 3 \times NS + 1$, wherein N is the number of required conductors from the controller to the last string, NS=number of strings connected end to end.

If all RGB bulbs from all strings are to be controlled together then the formula is merely 3 conductors for the R-G-B colors plus a neutral.

Also disclosed is a system for configuring the display of lights in a lights string having any or all of the following elements:
  a. a plurality of color controllable lamps wired into a slave string of lights;
  b. each of said strings having at least one address and a processor controller for responding to commands sent to that address;
  c. a controller connected to said string to provide power and address signals thereto;
  d. a device wirelessly connected to said controller for transmitting commands to said controller;
  e. said device including a camera;
  f. a display screen including a color pallet;
  g. said camera configured to capture an image, compute the dominate color in is field of view as a point on said color pallet;

h. a sender to transmit color instructions to said address;
so that said light string will display a color equivalent to the dominant color on said image. It may also include a display screen with a color pallete or discreet color selections.

Also disclosed is a system wherein said point on said pallet is user adjustable to a different color. So even if the camera captures a dominate color, the user still has an opportunity to shift if on the color pallet before sending it to the light string.

Also disclosed is a system wherein the dominate color is the color which fills more of the screen than any other color.

Also disclosed is a system wherein the dominate color is an average of all colors in the image.

Also disclosed is a special effects illuminated ornament (which includes a light string, a light, a garland, wreath, etc.) having any or all of the following:
  a. a pair of spaced apart sidewalls defining a gap therebetween;
  b. said sidewalls including, optionally, a plurality of perforations;
  c. a motor driven multicolor illuminated multifaceted light dome located in said gap;
    whereby, said illuminated dome projects a rotating light pattern upwardly and varying colors through said optional perforations as said dome rotates. Power may be provided by a battery, EMF induction or a pigtail socket which plugs into a light string socket.

Also disclosed is a system for controlling icicle lighting comprising:
  a. a plurality of icicle segments each including a plurality of adjacent lamps; said segments being configured to be oriented generally vertically cascading with adjacent segments being in a generally descending pattern;
  b. a controller for sequentially activating and deactivating said adjacent lamps from top to bottom to simulate water dripping,
  c. then when the last lamp in a segment is activated and then deactivated, activating the first lamp in the next adjacent descending segment, to simulate water dripping from one icicle to the next lower one.

Also disclosed is a system for controlling shooting star lighting having any or all of the following (shooting star being known in the lighting industry as a strip of light in separate segments):
  a. a plurality of shooting start segments each including a plurality of adjacent lamps; said segments being configured to be oriented generally vertically cascading with adjacent segments being in a generally ascending pattern;
  b. a controller for sequentially activating and deactivating said adjacent lamps from bottom to top to simulate a rocket trajectory,
  c. then when the last lamp in a segment is activated and then deactivated, activating the first lamp in the next adjacent ascending segment, to simulate a next rocket stage ascending.

Also disclosed is an energy efficient wireless ornament system having any or all of the following elements:
  a. an exterior ornament having a shell with an aperture at its top;
  b. a hanger fixture sized to be receivable within said opening but may also be attached to the ornamental system at any other location, said fixture including:
    i. a wireless receiver for receiving transmissions from a controller;
    ii. a power storage element;
    iii. an illumination element;
    iv. a processor for receiving said transmissions and operating said illumination element;
  c. a wireless transmitter controller capable of communing with said ornament;
  d. a trigger or timer in said controller for sending a sleep/signal to said ornament to put it in/wake it up from a sleep mode according to user programming, so that said ornament is not illuminated in sleep mode.

The result is a wireless ornament whose energy is not wasted when no one is likely to view the ornament (late night) or when the bulb illumination would not be visible (sunlight).

Also disclosed is a system including an EMF receiver in said ornament and wherein said controller includes a source of broadcast EMF energy to charge said power storage element. Even low power EMF will charge a battery for later use when the device is in sleep mode for example.

BRIEF DESCRIPTION OF THE SEVERAL VIEWS OF THE DRAWINGS

FIG. 16 is an image of a multi-element/color/multi-white LED.
FIG. 17 is a top view of the LED in FIG. 16 with the top removed.
FIG. 18 is a schematic view of a multi-chip LED surface mount package (SMD) showing a cool white and warm white LED adjacent each other.

FIG. 19 is a schematic view of a multi-chip LED surface mount package (SMD) showing a white and RGB (3 primary color) LED adjacent each other.

FIG. 33 is a sequence of bulbs by circuit number.

FIG. 34 is a circuit diagram for a multi string circuit corresponding to incandescent bulbs 1-2-3 of FIG. 33.

FIG. 35 is a view like FIG. 34 except using LEDs.

FIG. 36 is a sequence of bulbs like FIG. 33 except in a different sequence.

FIG. 37 is a view of RGB bulbs wired in a three conductors+neutral circuit to control the color mix of the bulbs.

DETAILED DESCRIPTION OF THE DISCLOSURE

First Embodiment

Remote Control Ornamental Illumination with Color Pallet Control

Figure 1:
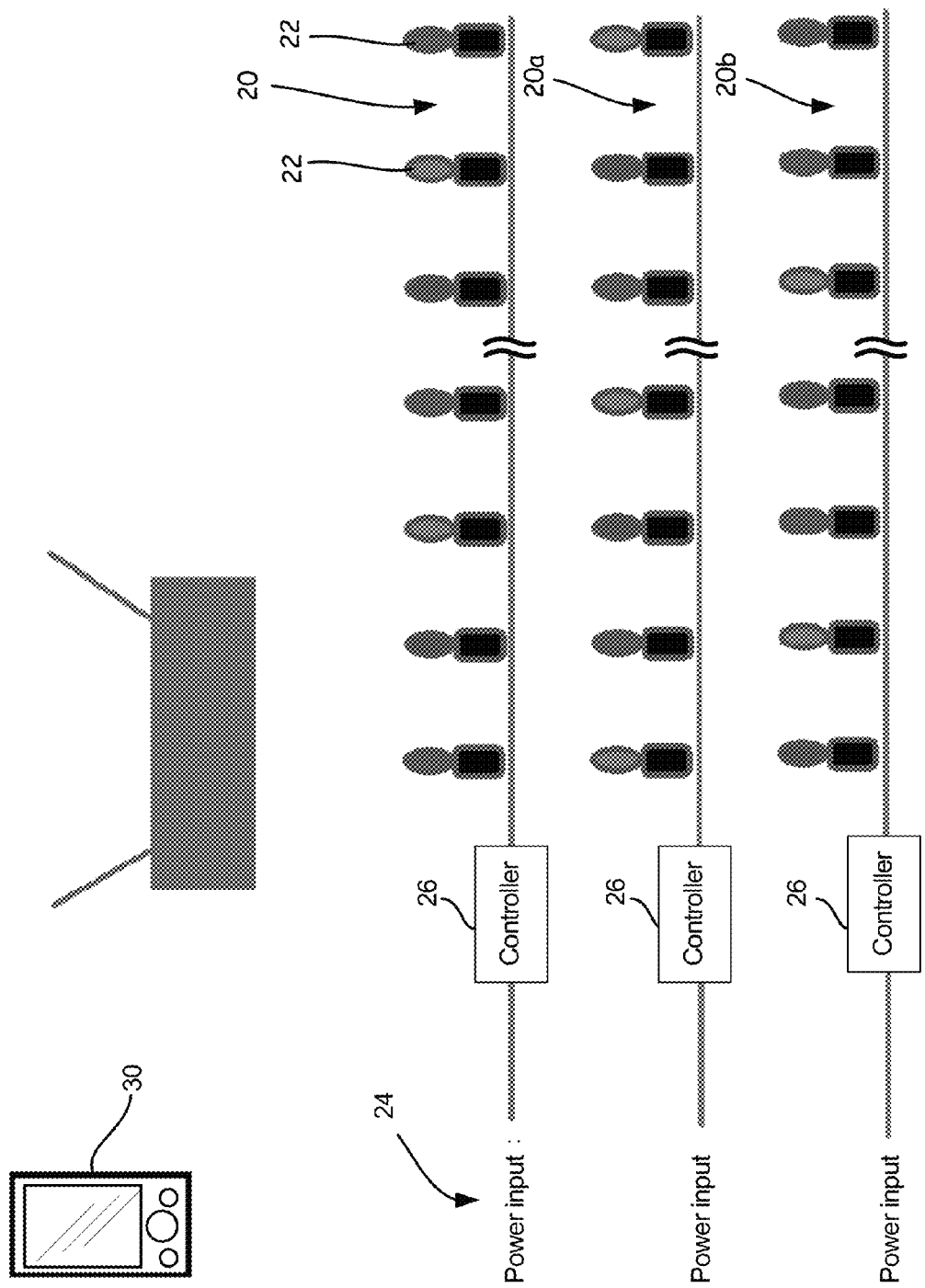
FIG. 1 is a schematic view of a lighting system.

In this preferred embodiment, in FIG. 1, a light string 20, of a series or parallel (or both) connected illumination elements, typically LEDs or incandescent bulbs are connected to a power source 24.

Figure 2:
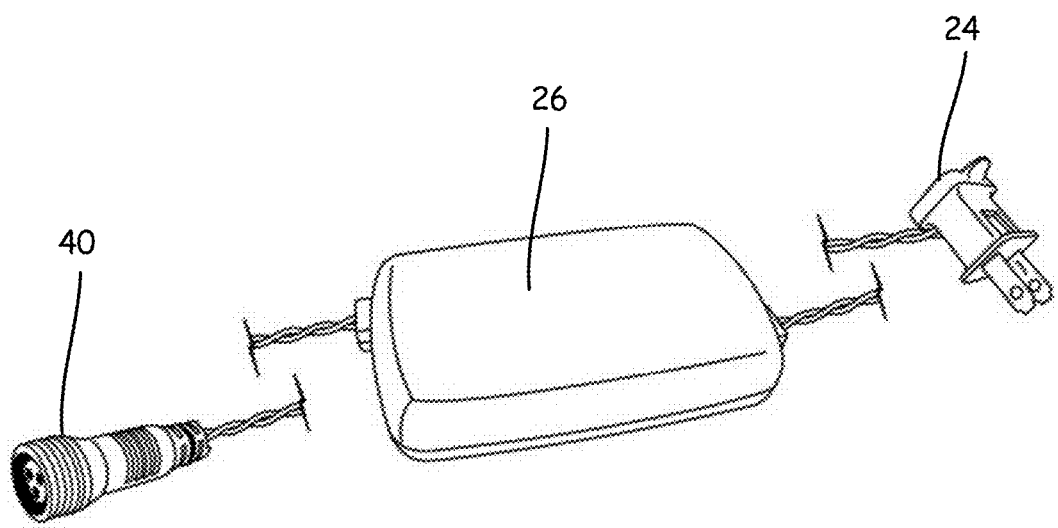
FIG. 2 is an exemplary illustration of a control unit for a light string.
Figure 3:
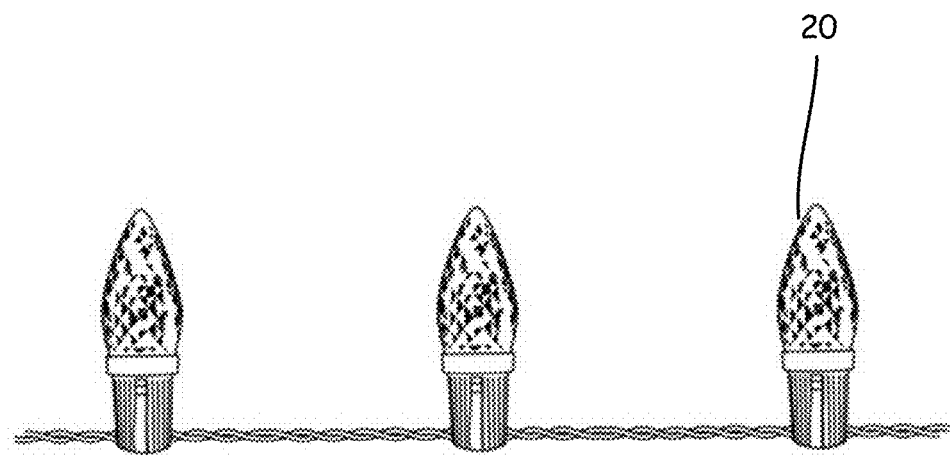
FIG. 3 is an exemplary illustration of part of a light string.

In addition to power, a control box/controller 26 is provided between the power source and light string (though other interconnections, such as at the end of the light string or intermediate thereof, are possible) via a connector 40 (FIG. 2) to control the flow of the current/voltage to the string of lights, as a whole or individually. In an alternative embodiment, commands can be sent to individual bulbs. These addressable bulbs or LEDs may have a local microprocessor and control unit to determine how much power to send to each LED to which the processor is associated and the type of flow control and color combination, such as flashing, fading etc. The control box may be hard wired to a user controller 30, but is preferably configured to receive wireless signals, such as by WIFI, Zigbee™ or Bluetooth® or other protocol which can exchange data from a user controller 30 selectively address a particular light string or multiple lights string controllers. The preferred user controller is a wirelessly enabled device such as a smart phone, pc, tablet, etc., which can preferably run an application (app) to provide a user interface.

Figure 4:
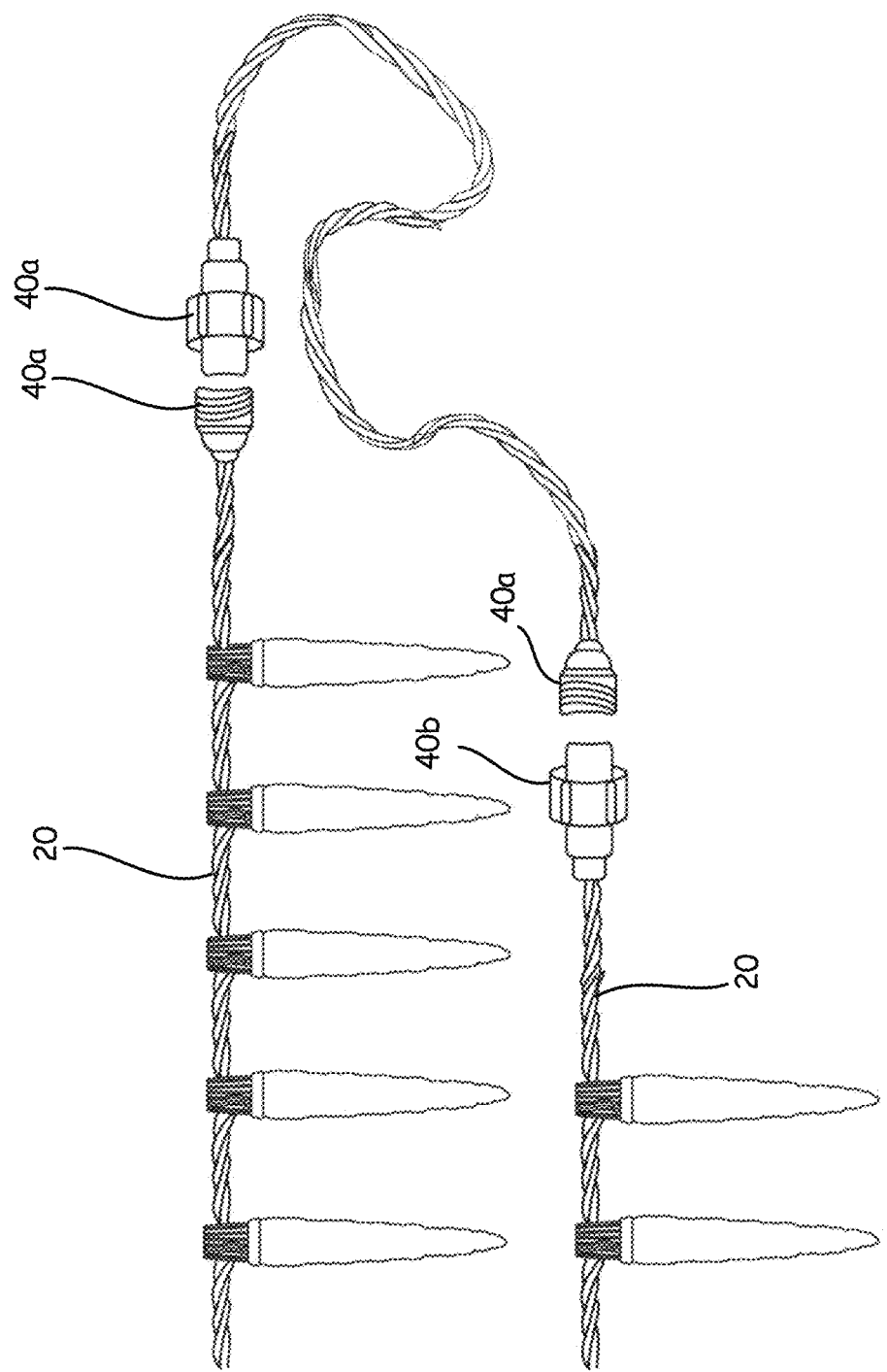
FIG. 4 is an exemplary illustration of a non-illuminated extension unit or a light string system.
Figure 5:
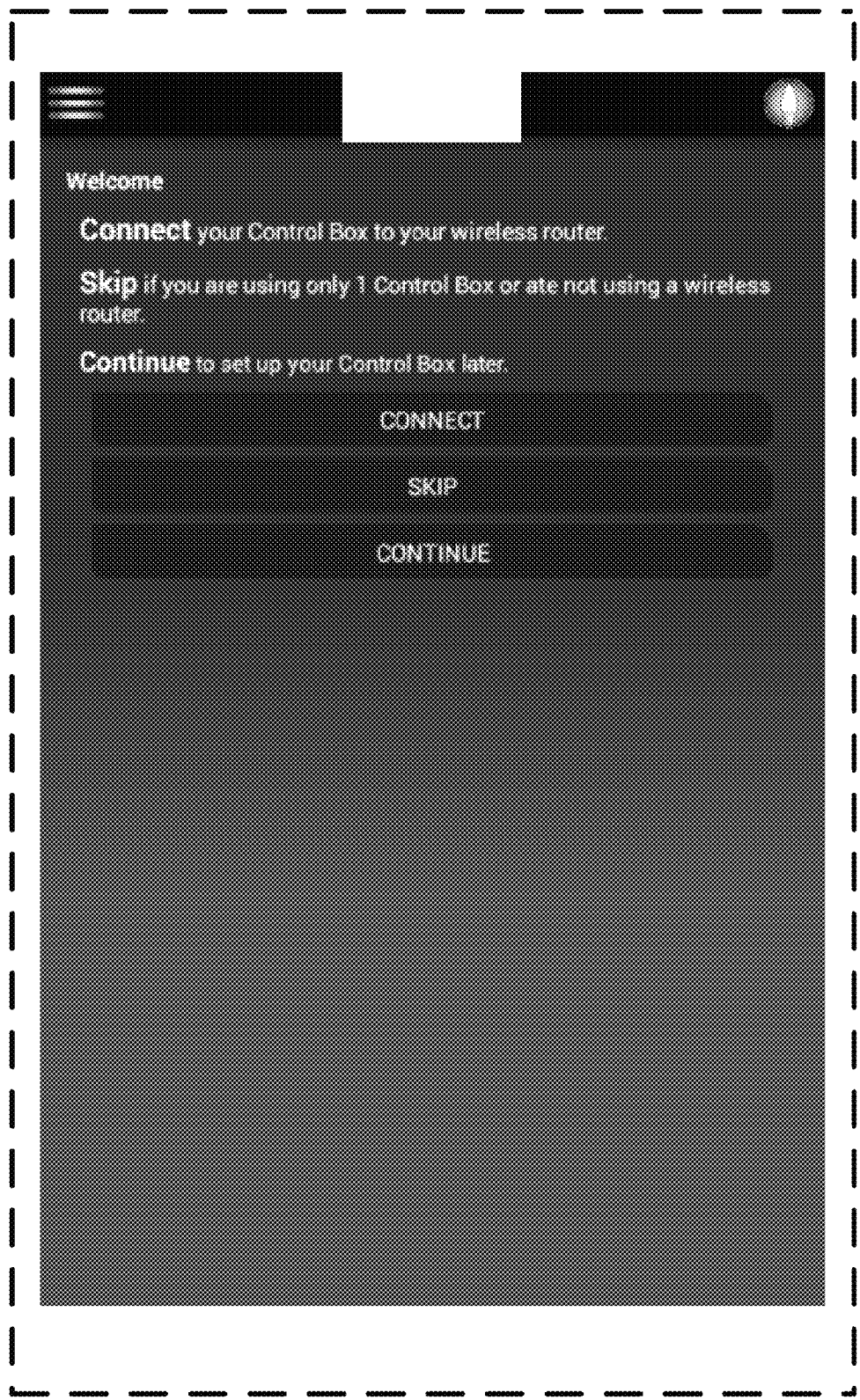
FIG. 5 is a screen capture of a light control software application connection screen.

Several light strings (20, 20a, 20b) can connected to the user controller 30 with each having its own control box and electronic address, or in a daisy changed arrangement, such as in a master (controller)-slave (light string) configuration, each string/bulb being separately addressable. An example of multiple slave light strings 20 is shown in FIG. 4 with male connectors 40a and female 40b. In order to provide for breaks in the light strings, an extender/spacer with no lights 42 can be provided but connectors and electrical pass through. This makes it possible to design light string patters where there needs to be an unlit crossover or space. For example, if the light string is a light rope (bulbs closely spaced within a tube) used to spell words, the spaces between the letters need to be non-illuminating. Such extension provides electrically connected gaps. Within each string or extension are at least three conductors: Power (+), ground (−) and (serial) data. Also when decorating several trees, the extension can be used between the trees so that there are not lights between the trees where not needed.

Because of power consumption by each string, compensation must be made to insure that the last string will have sufficient voltage/current. In the preferred embodiment, the voltage requirements of each processor is about 5 vdc and the power supplied from the power source is about 20 vdc. Therefore each light string (slave) will have its own voltage regulator connected to the connector for regulating the voltage to about 5 v. In a typical configuration, 12 slaves can be strung together but that is not a limitation of the technology, but the power supply, wire gauge and regulatory issues.

For example, if a light string 20 has a single address for the entire string, and light string 20a has 50 address corresponding to each lamp on the string, then the controller can address 51 different lights (one being a string as a whole) and operate them in any desired pattern by programming the controller to issue commands to each bulb/string by IP address. Conversely, there may be one controlling unit connected to one or more light strings, which receive a data signal from the controlling unit indicating what function and/or color each bulb, should exhibit at any given time.

Further, the bulb or string at each address may be controllable in a plurality of ways, including but not limited to:
Non color characteristic's:
  a. on/off;
  b. intensity;
  c. frequency (such as pulsing or variation of brightness); or
color characteristic: color or combinations thereof, and such combinations can be combined into a function and functions can be sequentially executed (concatenated functions).

With respect to color, the bulbs may use a plurality of ways to achieve desired color. For example, a bulb/lamp 22 may include an LED 46 (FIGS. 16-19 and 23) may include an RGB color set of three colors independently controllable LED chips 50/50a or one or more colors with (or without) a white LED 48/48a of a predetermined color temperature, such as cool white.

A common complaint of LED lighting is that it is a poor approximation of incandescent lighting. By pairing warm and cool LEDs proximate each other, the user can control a nearly full spectrum of white color temperatures to not only approximate incandescent, but any desired white balance as needed.

As shown in FIGS. 17-23, in an alternate configuration, a warm white LED 52a (shown in a SMD surface mount LED example) is paired with a cool white LED 52b.

By controllably switching the intensity or pulse rate (flash) of each bulb in the RBG group, or different temperature white LEDs, the combined output can be adjusted to achieve a near infinite amount of color variations or color temperatures of white. Flashing about 60 hz is normally not perceptible, so a higher flash rate of once color/hue or temperature LED will have the same effect as increased intensity but with lower energy consumption. The same can be achieved by ramping up or down the intensity of one LED faster/slower than another. The perception will be the same as a fixed intensity variation.

The user controller 30 can be configured to control and program all functions available to the light string and transmitting them to the light controller 26, where they are store and executed.

An exemplary operation of the user controller is as follows. In the preferred embodiment, the user controller is a smart device which can download and store application software (an app). The app can create a set of instructions/functions which can be saved and then transmitted to the controller 26 or the app can send a signal to activate a pre-made function stored on the controller 26.

Figure 6:
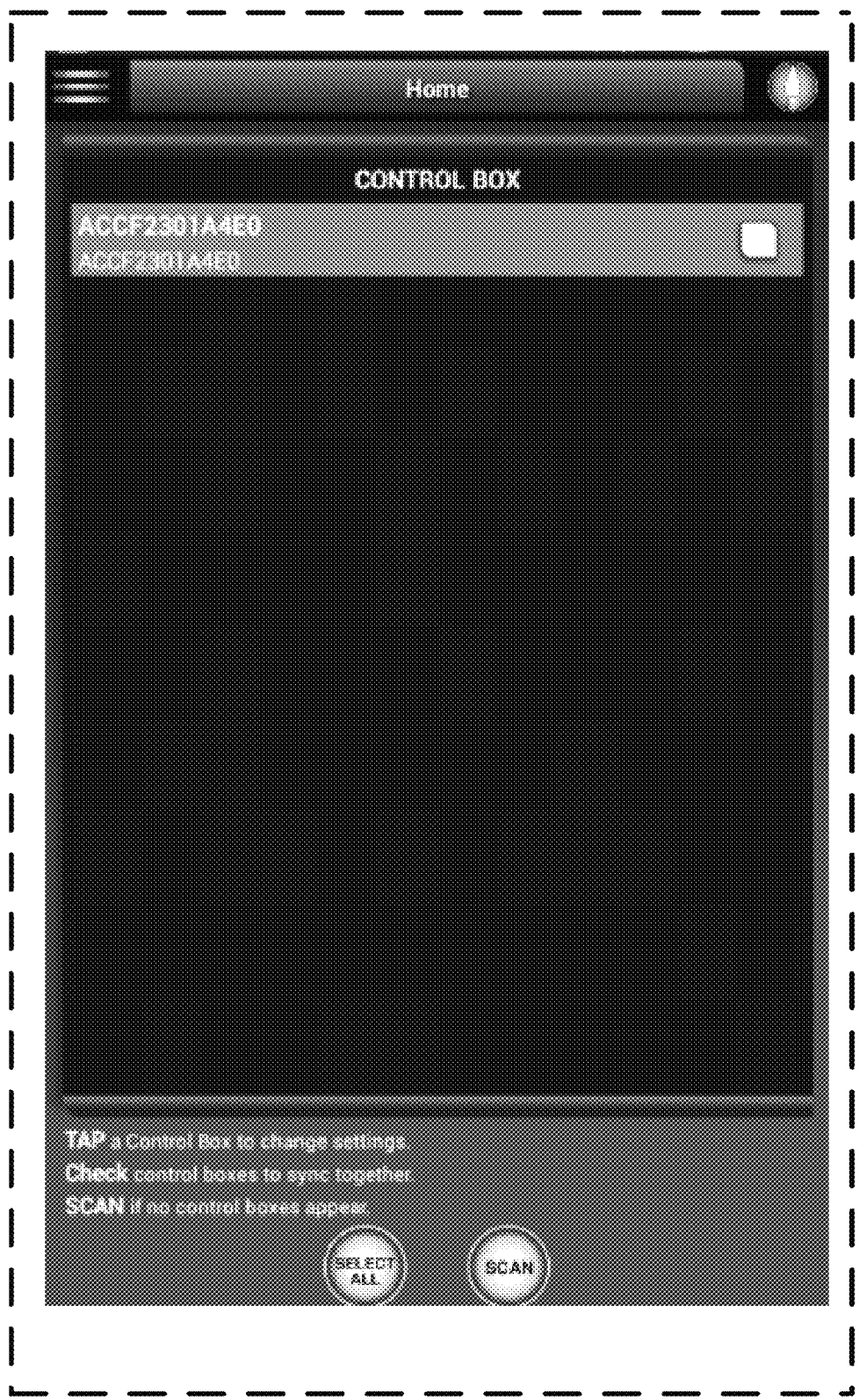
FIG. 6 is a screen capture of a light control software application connection screen showing a light string linked.
Figure 7:
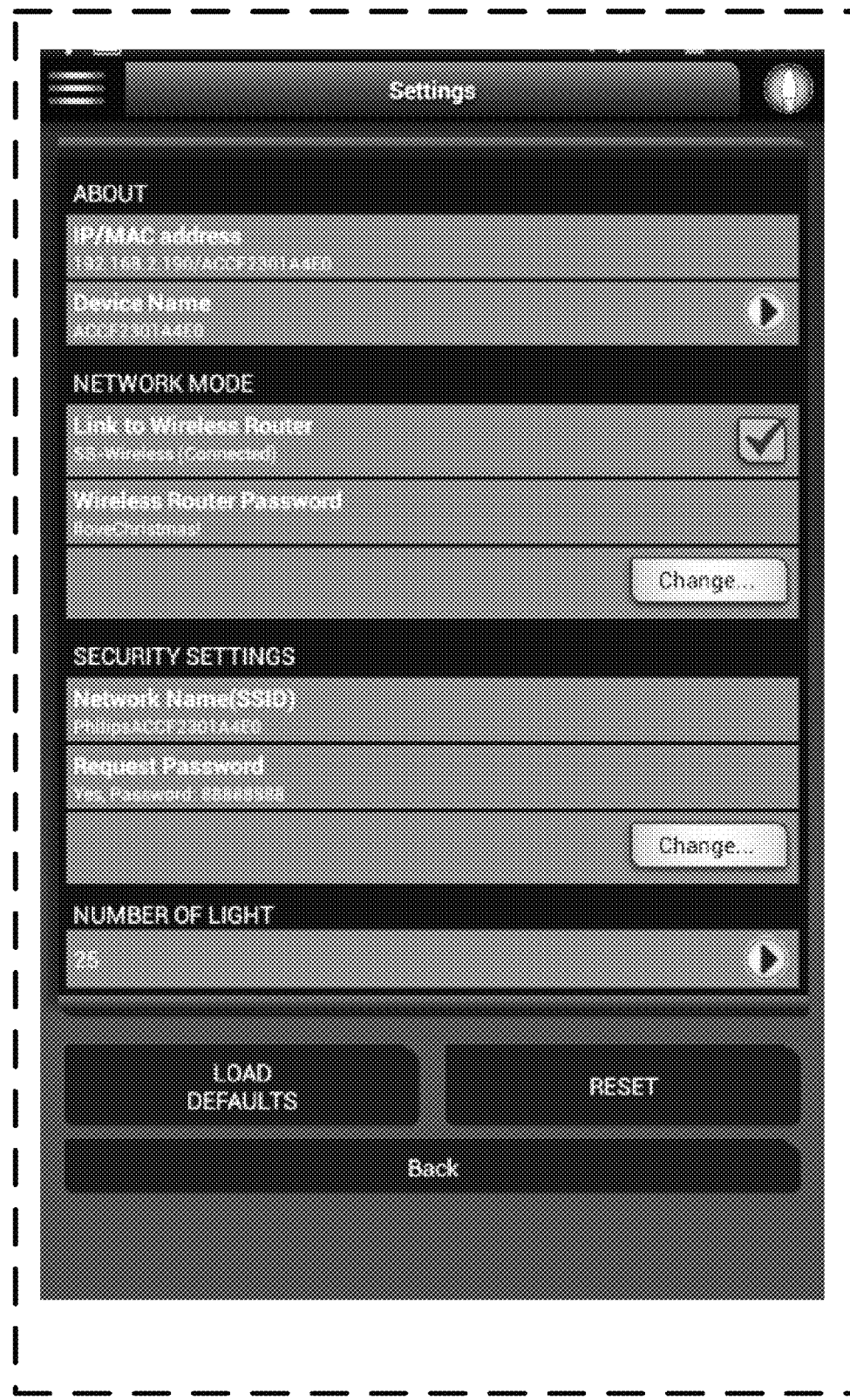
FIG. 7 is a screen capture of a light control software application settings screen.
Figure 8:
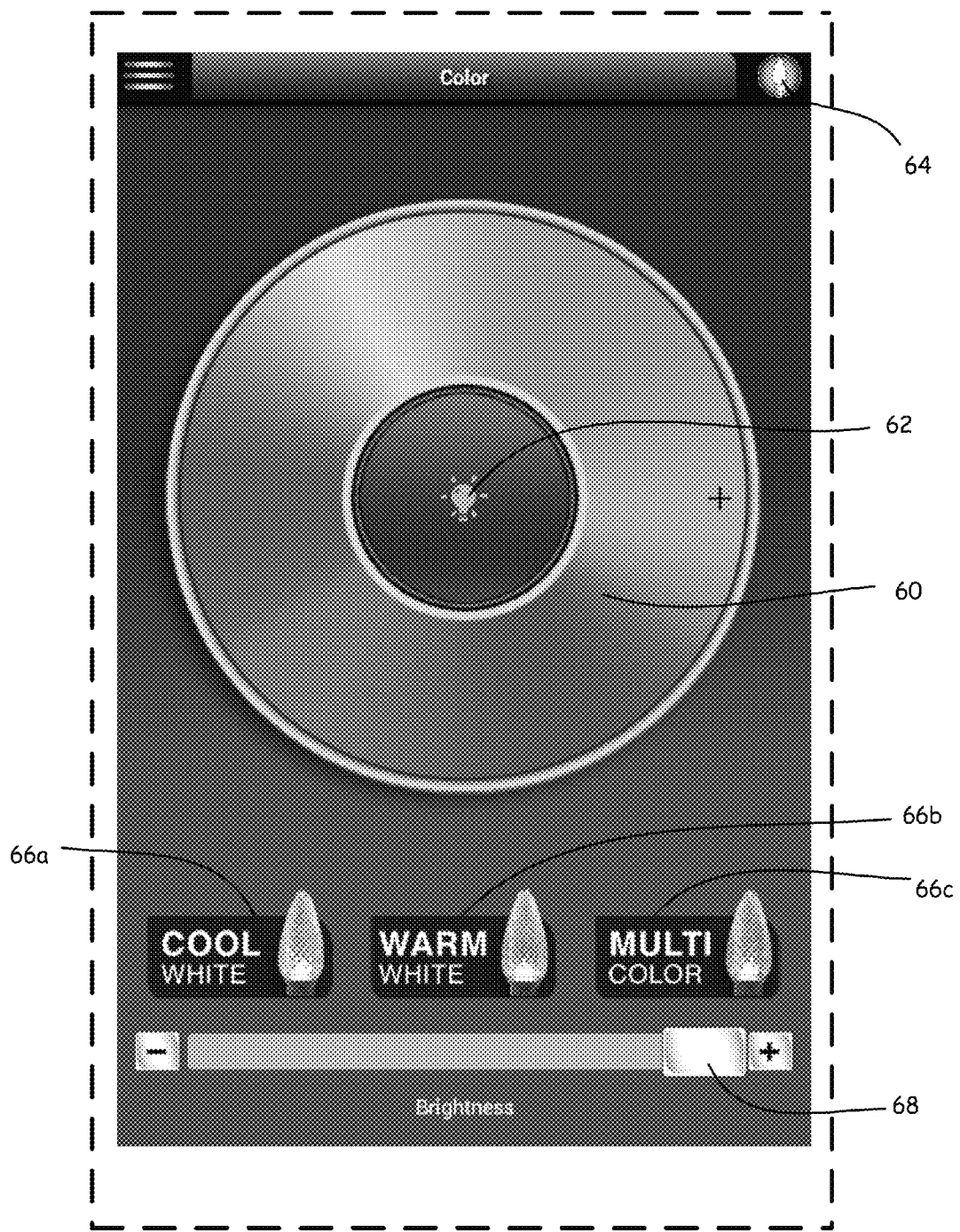
FIG. 8 is a screen capture of a light control software application color/hue selection screen.

The first step in this process is to locate the controller(s) 26 on the wireless network. Any wireless system can be used. As seen in FIG. 6, the app polls the network for addresses of a known format and displays them (FIG. 7) as compatible controllers and/or light strings. Either the controller(s) 26, poll their attached light strings to get a a) count b) type of lights connect, or the app can be configured to directly poll the light strings through the controller 26, or user selected in the app. Light strings may have a single address and a count of lamps or may have a count of individually addressable lamps. FIG. 8 illustrates network and password settings.

Figure 9:
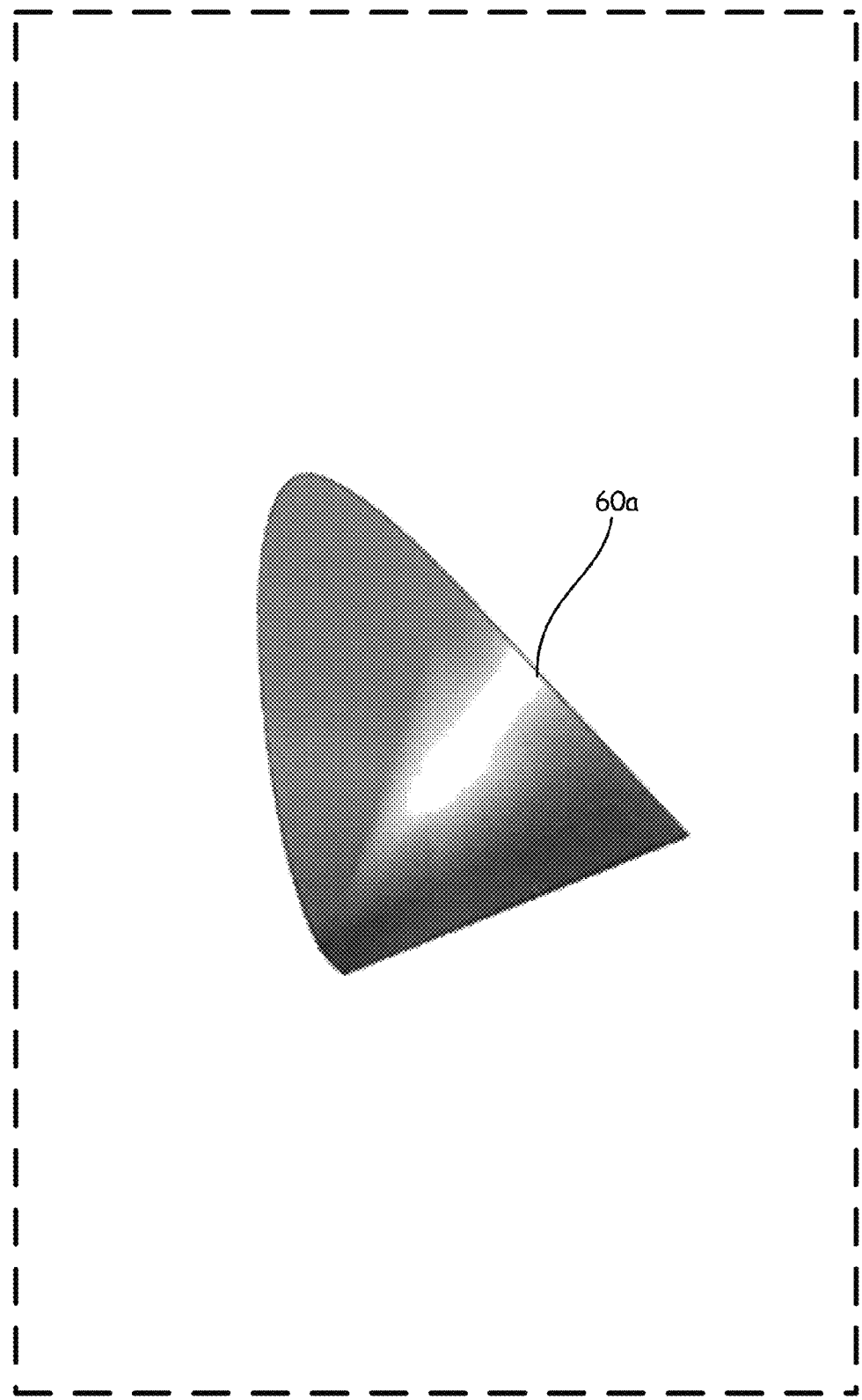
FIG. 9 is an alternate portion of the color/hue selection screen.

One option for the user to control the color of the addressable strings/bulbs is a touch screen pallet control 60 (FIG. 8). An alternative to a circular pallet is shown in FIG. 9 at 60a. The palate is a ring of gradually varying color of a ROYGIBIV pallet from red to violet. Tapping or sliding to a position on the palate and saves the selection with the selected color shown in the center "bulb" icon 62. Taping the bulb icon 64 turns the lights string on/off to the selected color or during any function. Three present color options are provide at 66a, 66b, 66c which override the pallet control but there is no limit to the number of preset color options that may be provided. Intensity of the lights is controlled by slider icon 68.

Figure 10:
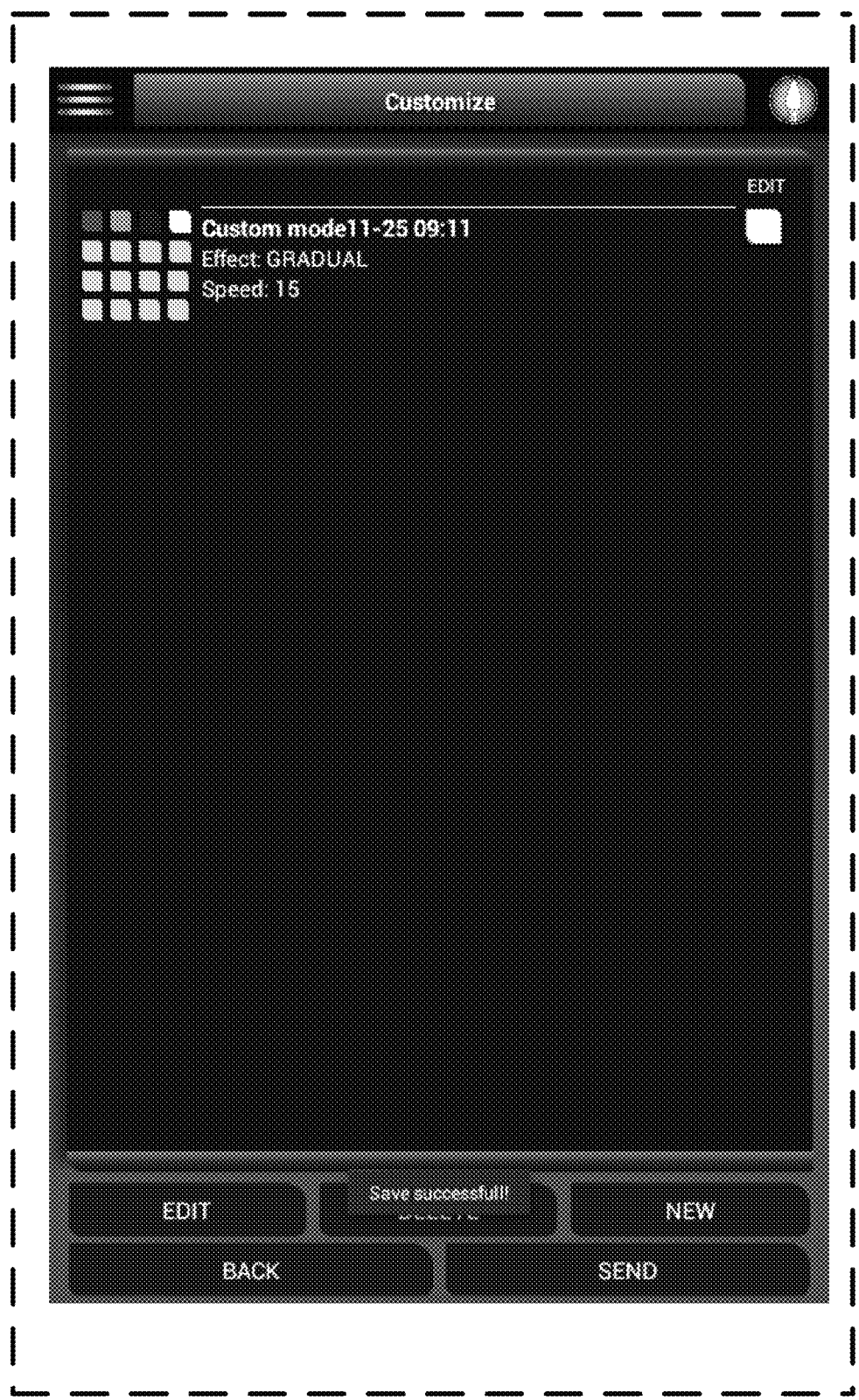
FIG. 10 is a screen capture of a light control software application customization screen for setting color/hue to individual bulbs or patterns for custom color sequencing.
Figure 11:
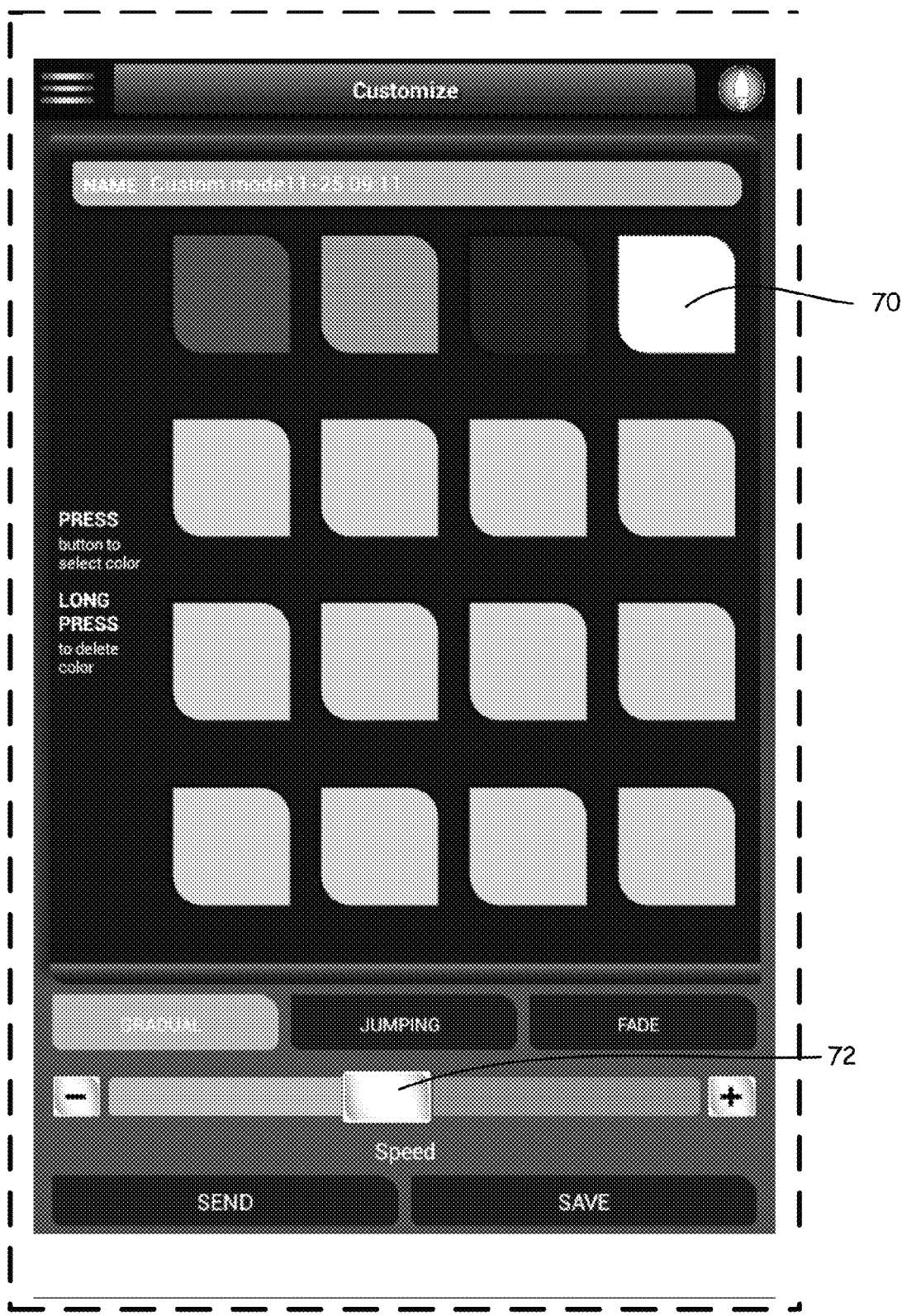
FIG. 11 is a screen capture of a light control software application customization screen with a close up view of a color matrix shown in FIG. 10.

FIGS. 10-11 show a customization routine for creating custom lighting patterns. FIG. 11 shows a plurality of square icons 70. The user taps on one square and the color palate appears. A color is selected and then that color fills the icon square. If the user wants the color sequence to move to a second or subsequent color, the next adjacent icon must be selected and then filled. The transition between colors is selected on the selection bar 72, which in this case, show three transitional options, but any combination may be provided for. When selected, the user can save the function to a list of available custom options (FIG. 10) then they can select and run from that screen. Light patterns can be sequences where the whole light string changes to each color or individual sequential bulb color patterns can be selected and pared with various sequencing functions.

Running of a saved function involves transmitting the sequence to either by connected controller 24 when then downloads in real time the sequence to the strings or bulbs individually.

Figure 12:
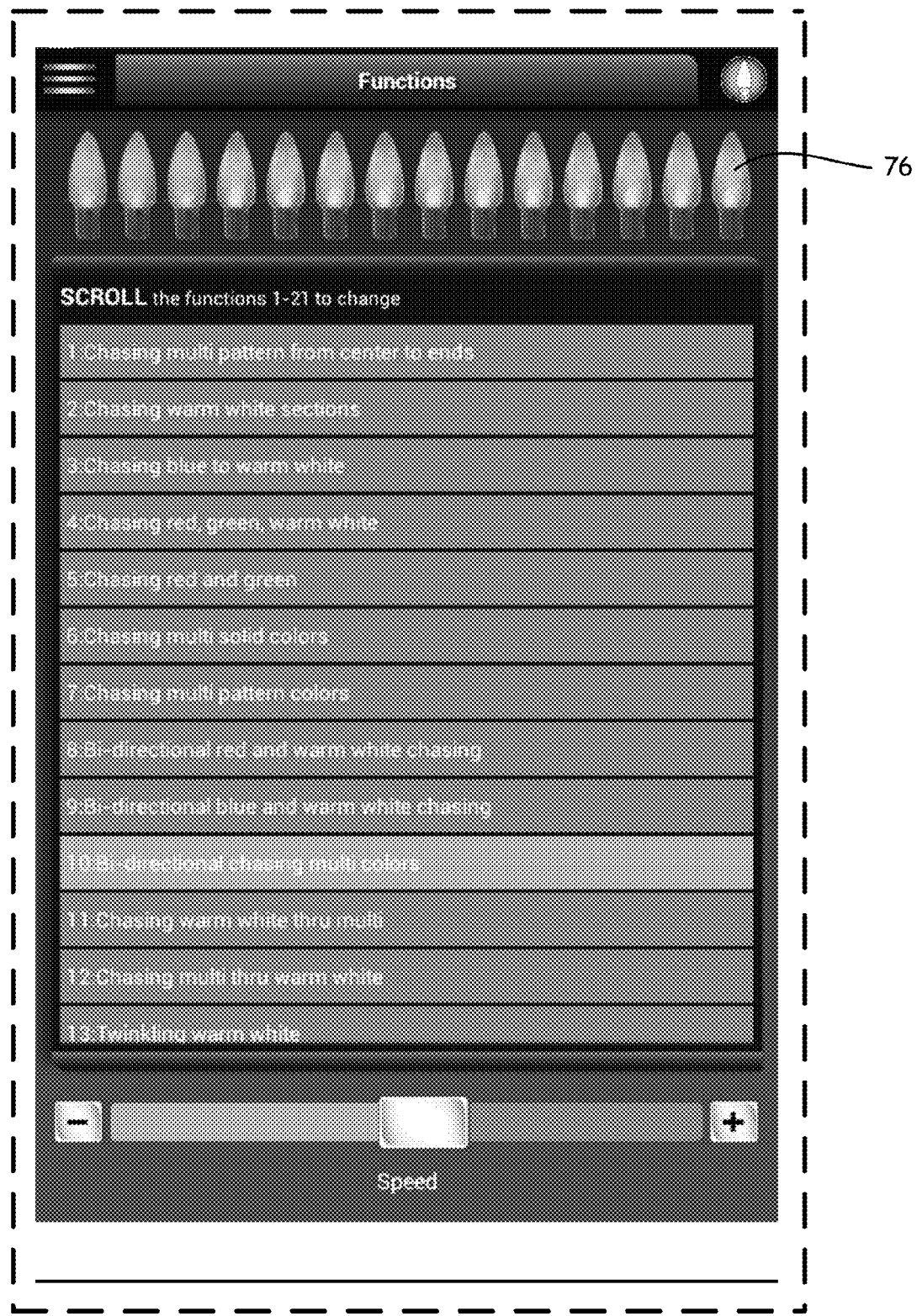
FIG. 12 is a screen capture of a light control software application customization screen showing factory set lighting configurations and patterns for light strings.

FIG. 12 illustrates the function display screen. Here a list of preprogrammed or custom programs appears. When one is selected, the actual function is displayed on the plurality of sequential bulbs 76. So for example, if a function of alternating red green bulbs is programmed and selected, the display 76 will show the sequential illumination of red-green bulbs as they will appear on the screen. If the user is satisfied with that selection, he/she can send the selection to the controller 26 for actual display. It is also possible to configure the app so that the sequence is displayed immediately on selection at the top display 76 and on the actual strings simultaneously.

It is likewise possible to integrate prerecorded, broadcast, etc. music with the illumination of bulbs. The app can retrieve pre stored music on the smart device 30 and use the tempo of the music to modulate the light, typically in intensity and time of illumination along with changing colors simultaneously or separately. It is also possible to supply the music directly to a control box inline with the light string. The control box can include a radio receiver/transmitter, Bluetooth®, WIFI, etc., or input for receiving a sound input and a sound splitter for directing power to specific groups of bulbs based on the pitch (frequency) of the sound. For example, one color (blue, for example) would be designated as low frequencies, and successively higher frequency bands would be associated with different color bulbs. The division of colors could also be based on amplitude instead of frequency, or other criteria.

Figure 13:
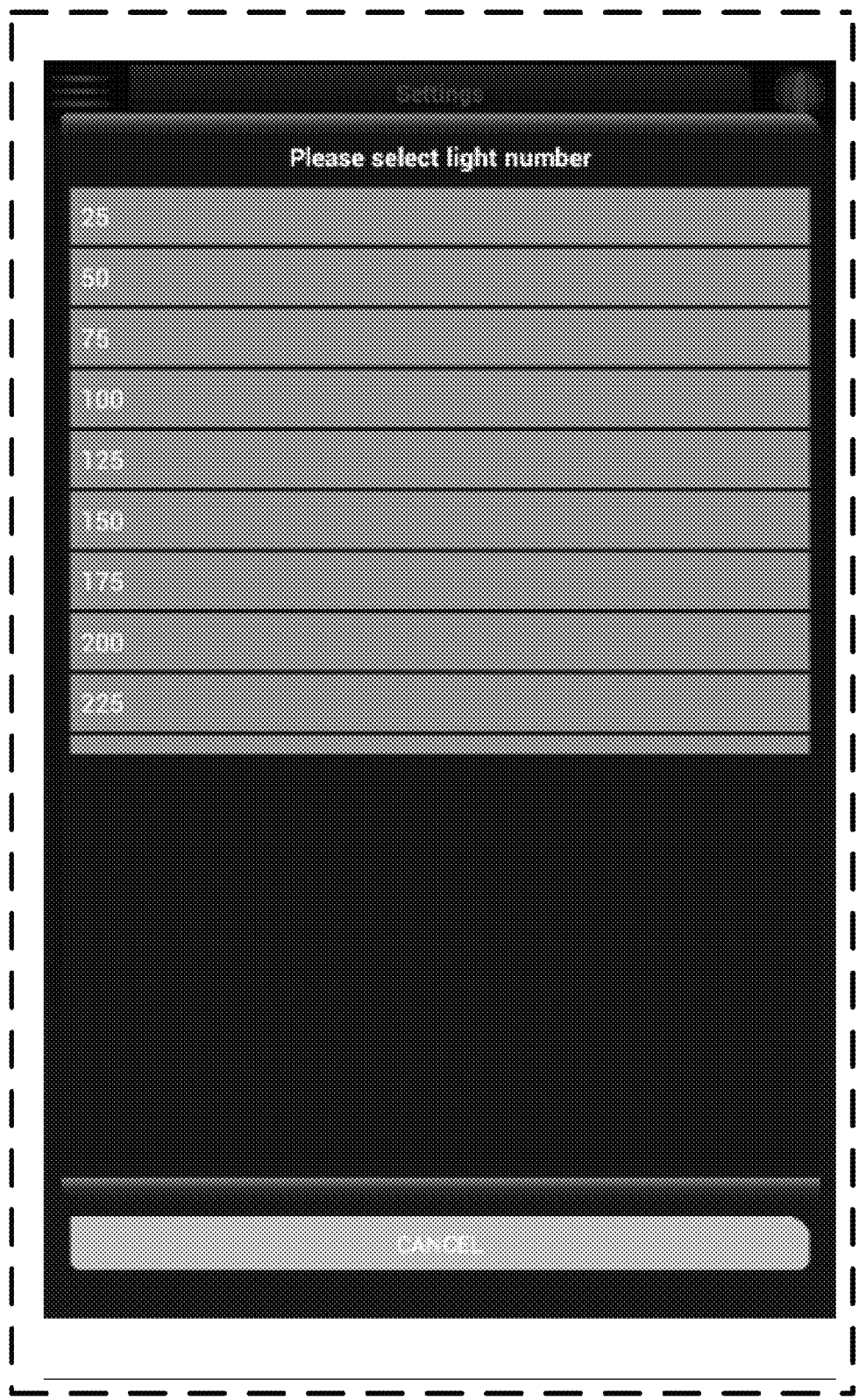
FIG. 13 is a screen capture of a light control software application customization screen direct addressing of light strings or individual lights by number.
Figure 14:
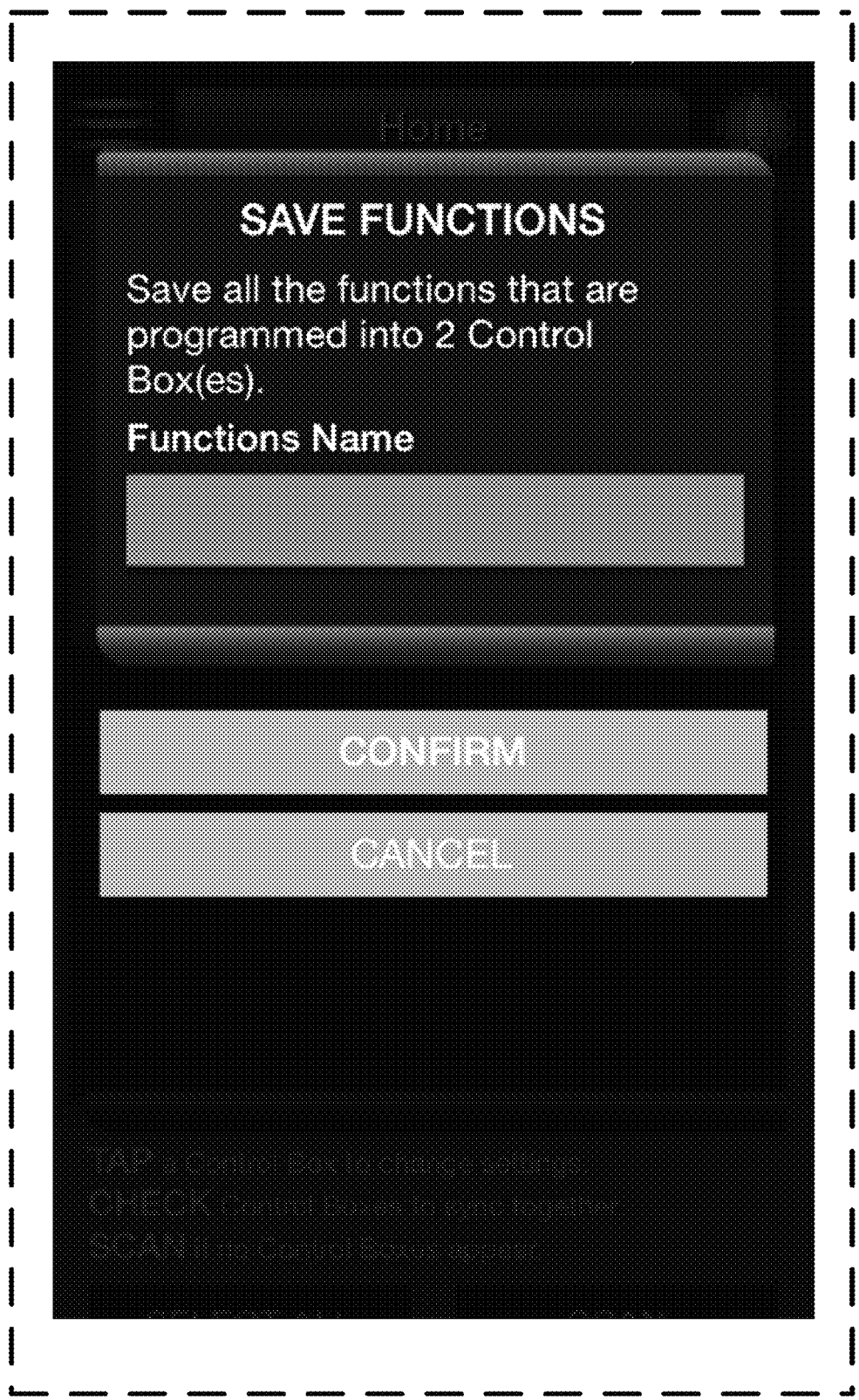
FIG. 14 is a screen capture of a light control software application customization screen for storing various functions that the user has selected for future quick recall, especially useful for multiple control box set ups.
Figure 14A:
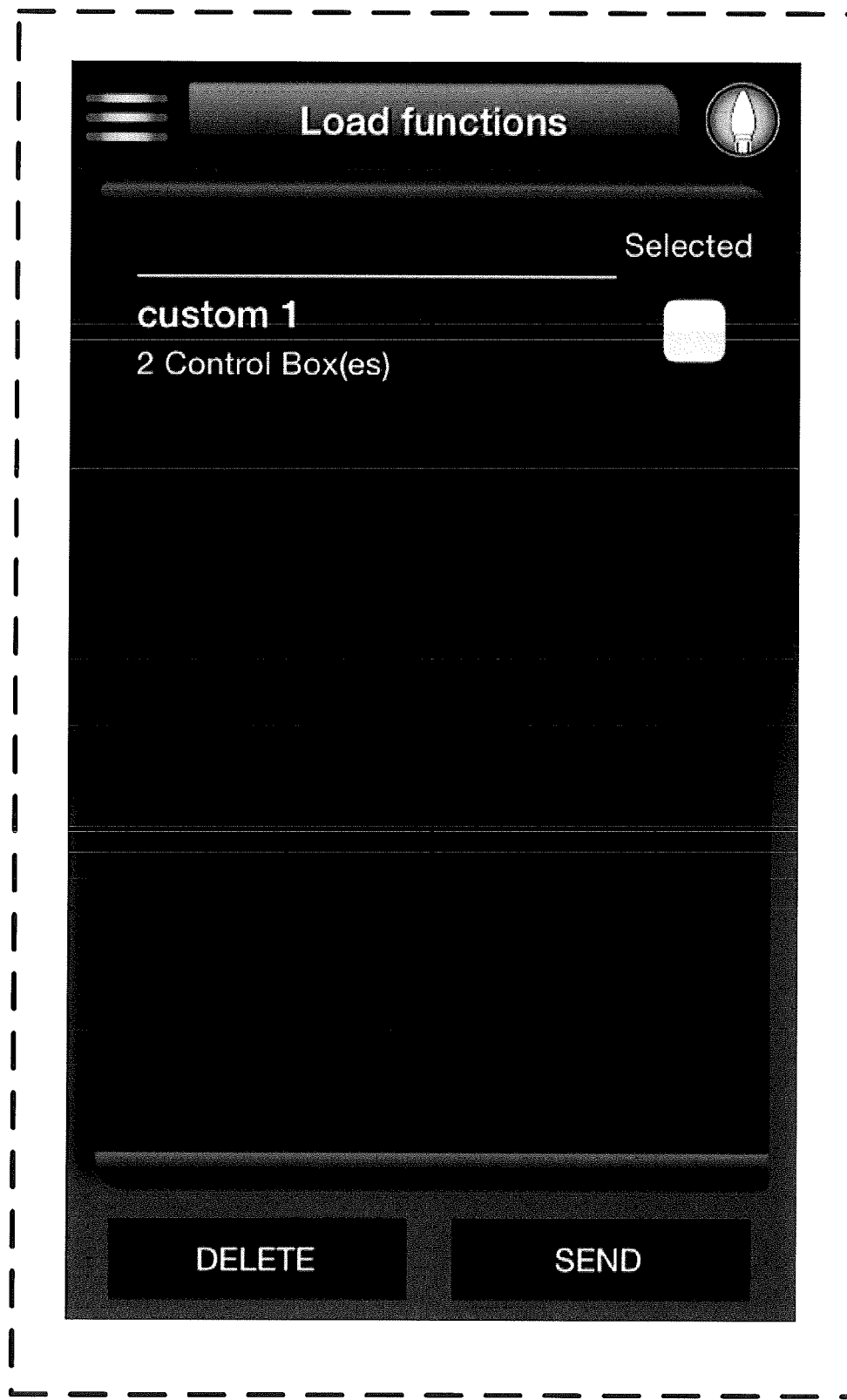
FIG. 14A is a screen capture of a light control software application showing a load function to load saved programming.

FIG. 13 illustrates the polling feature of the app. Since the user may daisy change and mix slave sets/strings of lights, the app needs to know how many lights/sets are under its control. FIG. 13 illustrates the results of a polling when 225 lights are shown. In this case only light strings are pollable, though individual lights can also be polled if so configured in which call bulbs could be listed by number. If a bulb in a sequence does not reply to a poling because, for example, it has failed, it will appear on the listing as non-responsive and alert the user to repair (or ignore). Likewise if an entire string is non responsive, the user may need to check connections. Alternatively, the user can select the number of lights connected to that particular control box.

With each light string or light bulb/element independently addressable, numerous light patterns are possible. For example, the string can:
1. illuminate from the middle (or other point in the string) and radiate outwardly to its ends;
2. illuminate inwardly from distal ends;
3. chase individual colors through a string, one bulb at a time
4. color one bulb at a time starting with one color (or multi-color pattern) and finish in a different color or color pattern;
5. create effects with the lights, such as motion and or special effects such as lightning effects or if multiple strings are laid out in rows, it may create a display with each bulb being a pixel.

It will be appreciated that the user can choose one of several preset motion and/or color changing functions or program their own motion and/or color functions as indicated below.

It is also possible to replicate a lighting pattern from string to string or from group of lights to a succeeding group. The user programs a group of a predetermined number of sequential bulbs to display a desired light pattern and then "copies" the pattern and applies it to other groups/strings downstream. For example the "wave" pattern known from sporting events, can be programmed into a short grouping of bulbs, saved and applied sequentially to successive groups so that the appears as a light or water wave, with illumination gradually switching from one bulb to the next with the prior bulb then gradually dimming.

Example: create dynamic motion using photo-representation (graphical image on app) of a plurality of light strings arranged in a grid of vertical and horizontal bulbs.

A string of lights in grid format may be represented/or drawn by the user on the app's graphical user interface with each bulb in the pattern identified by bulb number or other graphical indicators. The user touches each representation and then assigns it a color, and/or illumination pattern.

An example of a grid pattern would look like:
11111111111111
22222222222222
33333333333333
where 1, 2, and 3 represent separate slave light strings controlled by the same (connected by daisy chain) or separate controllers 26 and daisy chained by the app software.

Touching a bulb representation on the application can change that bulb's color or the entire string can be made one color in a single stroke.

The brightness of any bulb/string can be changed via the remote app also using a photo-representation/graphic image of light string and sliders for each bulb position or the entire set.

Furthermore, it is possible to combine with PIR passive infra-red or ultra-sonic detector to detect motion, locate detectors on graphic screen of app and adjust their range and sensitivity from the app, as is described further below.

In one embodiment, the user can draw a lighting sequence on app screen and have addressable light/strings respond in the order selected (like an animation sequence in PowerPoint®).

In another embodiment, the light strings can have 3 or more conductors to provide power and data lines which then can allow daisy chaining of further light strings. In a 3 conductor version data is sent via its own conductor using a common ground, but two conductors are possible with the data signal being modulated on a carrier which does not required a return ground wire. The strings are chained by a like connector at their ends.

In another embodiment, it is possible to poll all addressable bulbs to determine if any are dead/burned out/non-responsive and where bulbs/strings at known addresses will respond to a ping. The non-responsive bulbs may be easily located by causing the bulb on either side of the problem bulb to flash or provide another signal to draw attention to the location of the bad bulb. Likewise, a user can apply this "locate" feature to identify a plurality of bulbs or light strings in a larger string by causing it or adjacent lights to pulse/flash/visually identify their location. This may be particularly helpful in a pre-lit tree which contains hundreds of addressable bulbs buried in the branches.

In another embodiment, the system has the ability to program lights after polling. A carrier signal via the data line can be sent to "sync" multiple sets to the same function either on top of the power signal, or a separate data line. Syncing can mean to perform the same function as other light sets already connected (copy function) or cascade the sequence from the last light set to the new light set, or the opposite, amongst other functions.

In another embodiment, the smart device 30 includes a motion sensor and the movement of the device can be used to change function. For example, if the device is in color change mode, a gesture (movement) of the device can change the mode to flash (on/off setting) for a particular bulb or string. Further gestures can be used to save the function. The motion sensor can also be used to "paint" the sequence of bulbs to be illuminated without having to tap on each representation of the bulbs on screen, similar to using a pen stylus on a screen. For example, if the bulbs are oriented in a grid pattern and the user wants to draw the letter "A", he/she moves/paints the device into the shape of the letter A and all of the bulbs in that pattern will be designated as illuminated.

111111111111111
22222222222222
33333333333333

In the above case the letter A is formed by the underlined bulbs.

Because the letter A cannot be painted without either stopping the painting function to "cross" the A, the user may instead paint in one stroke and then manually turn off those bulbs which were needed on the return stroke to reach the crossover, but should not be illuminated. Even so, the motion painting option will be far faster than illuminating the grid of bulb individually.

Second Embodiment

Motion Responsive Lights

In order to make ornamental/holiday lights more interesting to the viewer it is possible to vary the intensity or color of the lights.

In addition to such concepts, the user will notice an even greater engagement with the lighting if it is responsive to external stimuli.

The same addressable light construction as described above may be used, but with the addition of sensors capable of reading/measuring events/movements/people/objects nearby as they approach or pass the sensors, or standard lights connected to a control unit with the addition of sensors capable of reading/measuring events/movements/people/objects nearby as they approach or pass the sensors.

Figure 15:
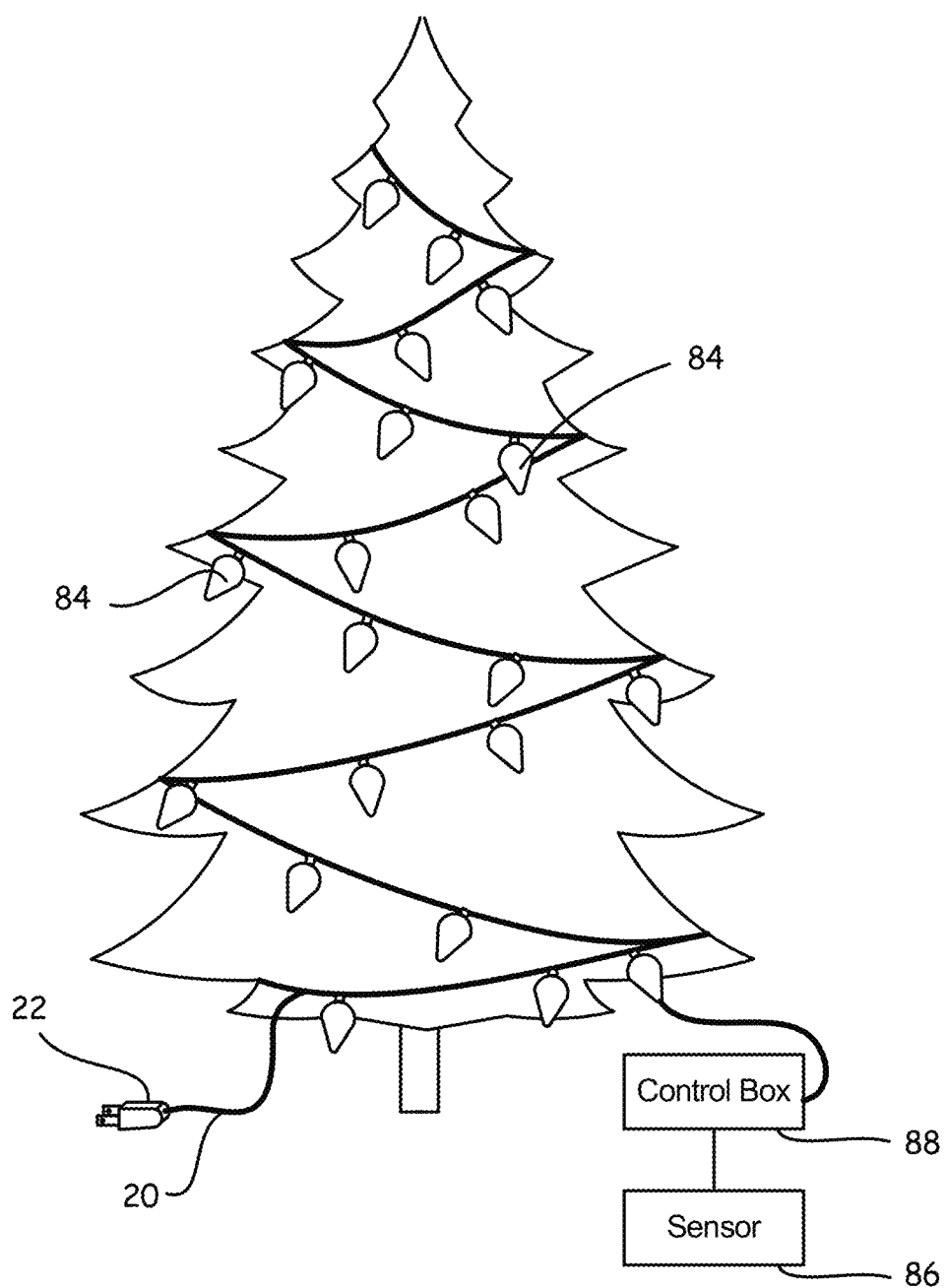
FIG. 15 is a Christmas tree with ornamental lighting, a control box and sensor.
Figure 20:
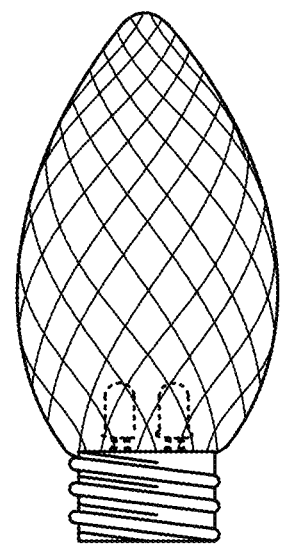
FIG. 20 is a side view of an ornamental bulb having a removable crown diffuser and two LEDs mount inside a lampholder.
Figure 21:
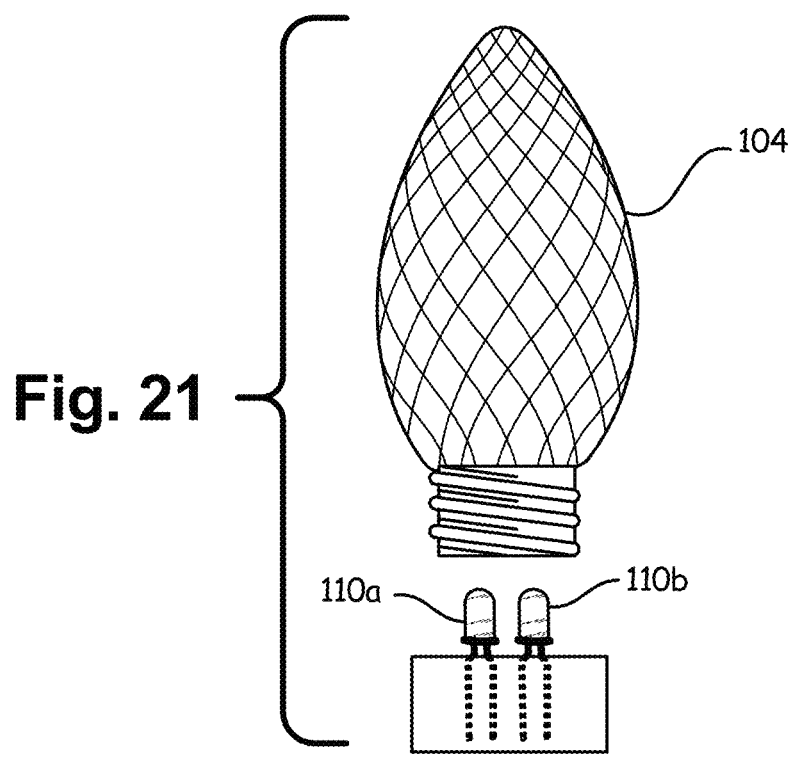
FIG. 21 is a view like FIG. 20 with the diffuser removed.
Figure 22:
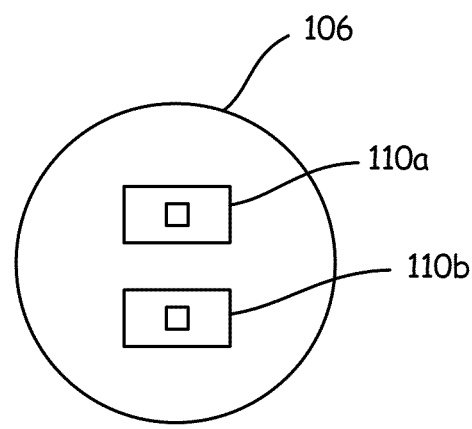
FIG. 22 is a schematic top view of the LEDs in FIG. 21 with a warm white LED adjacent a cool white.
Figure 23:
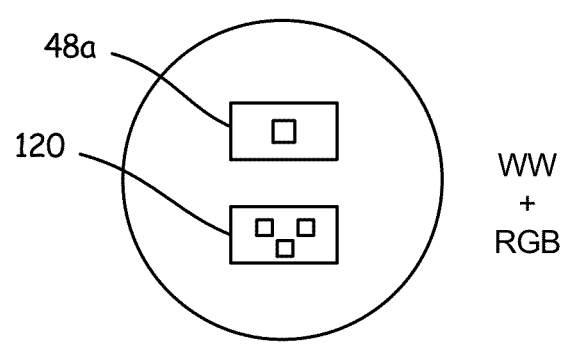
FIG. 23 is a view like FIG. 22 except one of the LEDs is replaced by an RGB LED.
Figure 24:
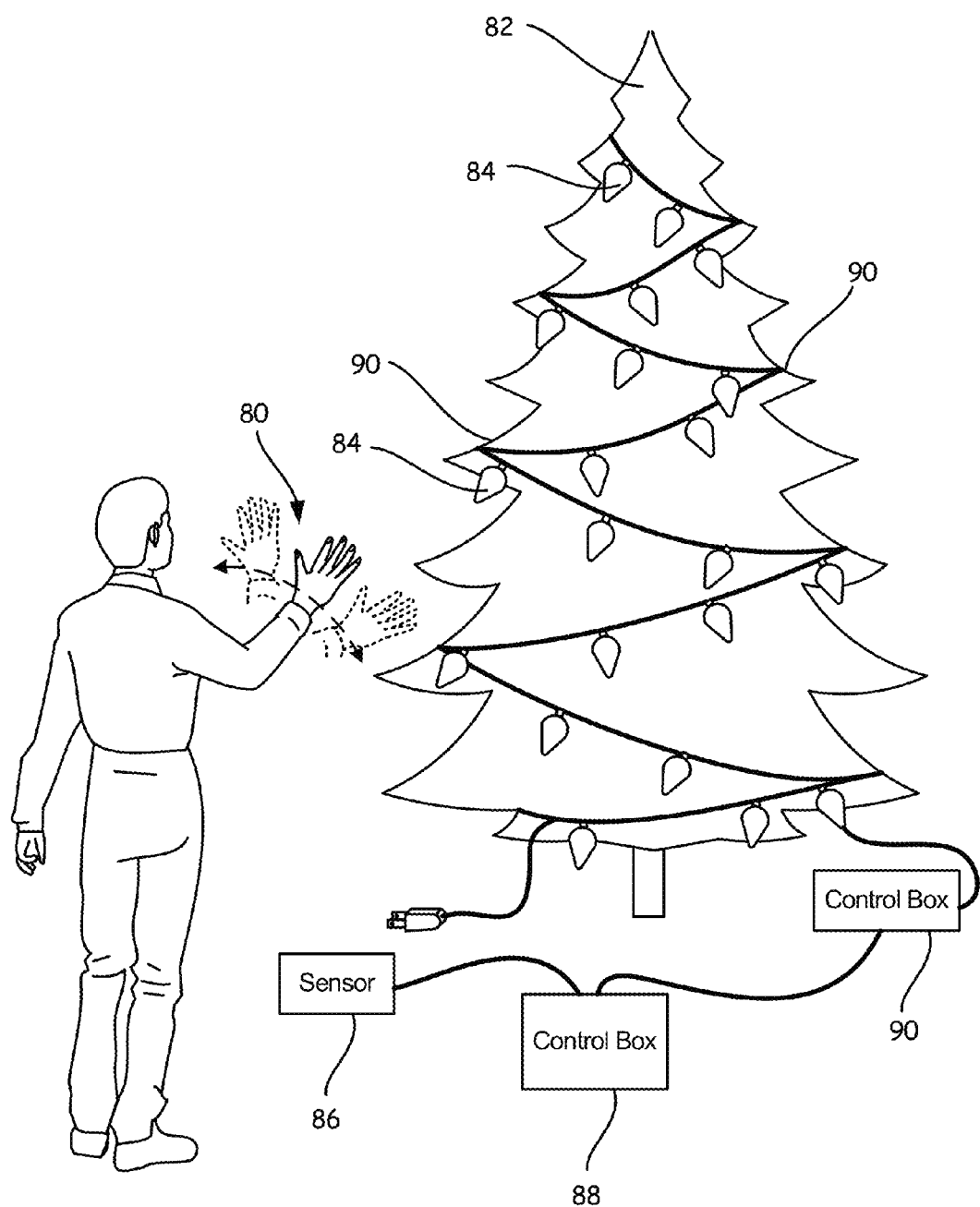
FIG. 24 is a schematic view of a user making hand gestures at an illuminated tree with gesture responsive sensors.
Figures 25, 26:
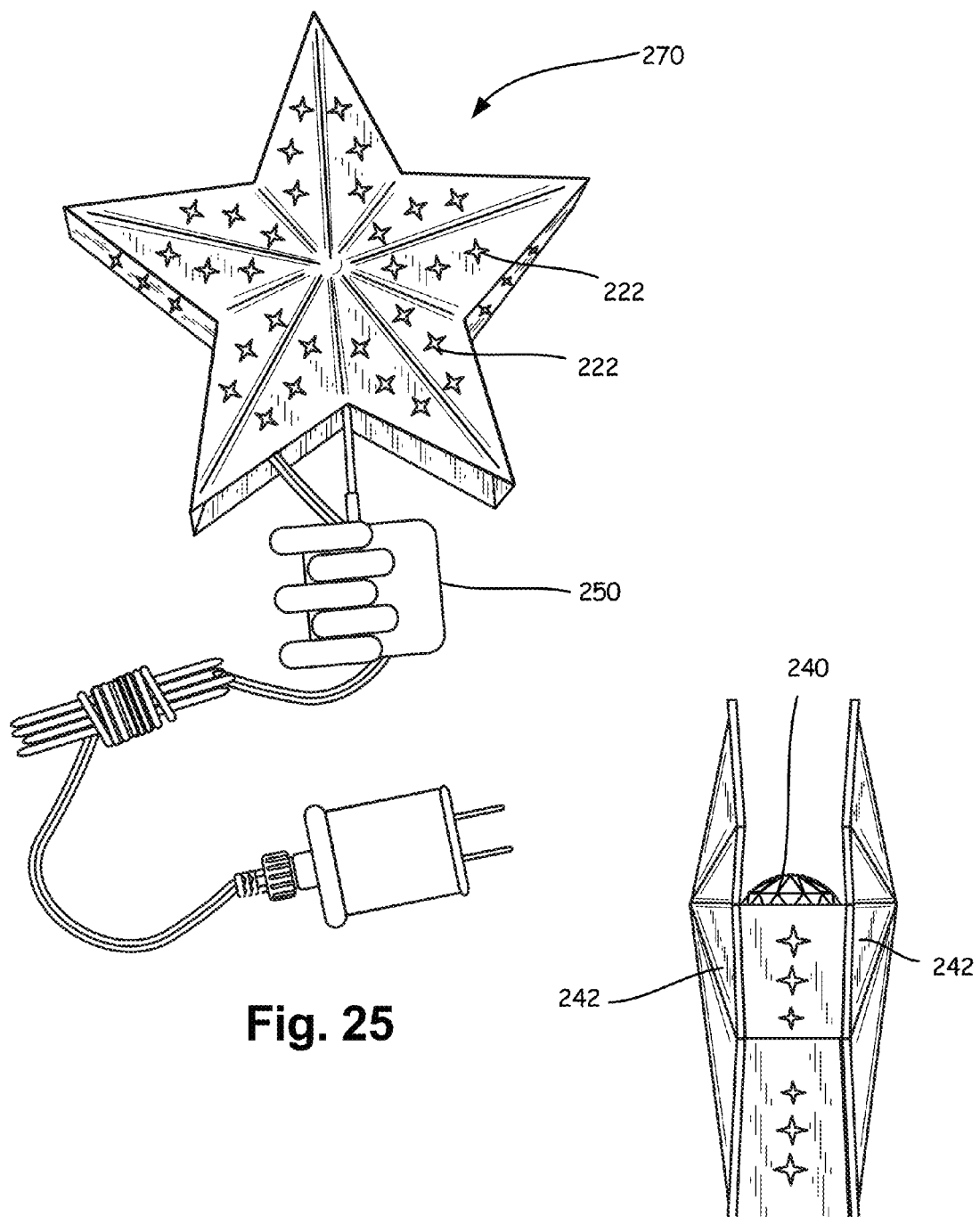
FIG. 25 is a perspective view of an ornament.
FIG. 26 is an end view of the subject matter in FIG. 25, the ends being identical.
Figure 27:
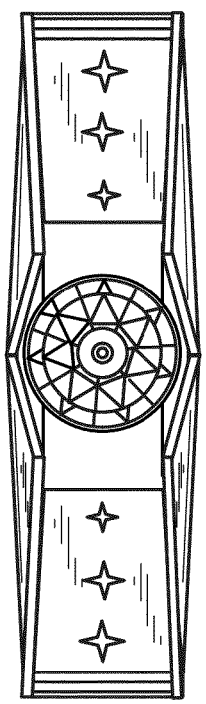
FIG. 27 is a top view of FIG. 25 except with perforations in end walls.
Figure 28:
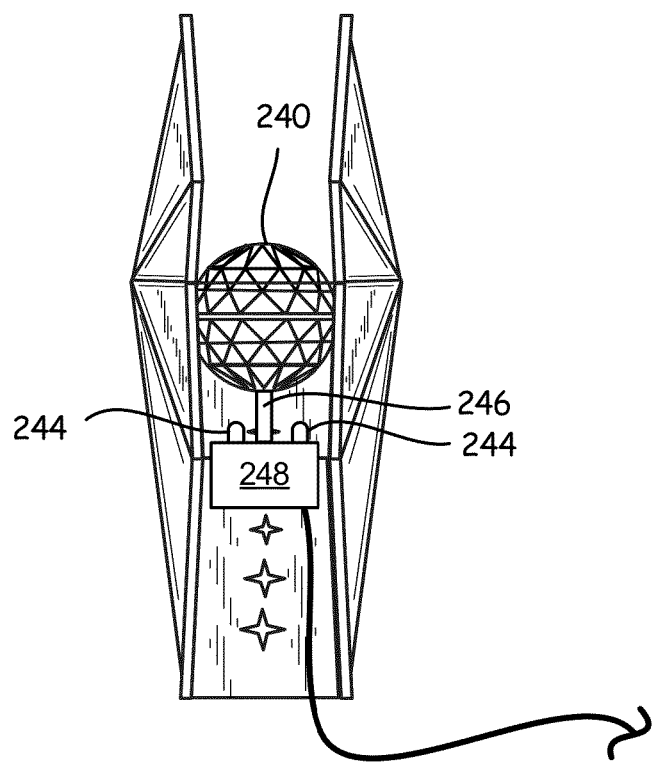
FIG. 28 is end view with portions broken away to expose the dome, motor and lights.

FIG. 15 illustrates a tree or other ornament with lights 84, a controller 88 and a sensor 86. FIG. 24 shows a user's hand 80 indicating motion adjacent a tree fitted with bulbs 84. In one embodiment, a sensor 86 senses the presence of an object (hand 80 for example) and the controller 88 initiates a predetermined action, such as illuminate all or some of the bulbs, increase illumination intensity, flash, dim, or other similar responses.

In a further embodiment, the tree is fitted with sensors which may or may not be within the bulb housings but are placed in a plurality of locations around the tree. Each sensor is associated only with a predetermined number of nearby bulbs and not all bulbs, so motion response is more specific. When a user's hand approaches, some sensors will be triggers and bulbs to which they are associated, will take a predetermined action, per above.

For example, if each bulb had its own associate sensor, as a hand approached, affected bulbs could pulse and get brighter, dimmer, shimmer, etc. As a person's hand swept across the face of the tree, the sensor would trigger sequentially and the lights controlled by those sensors would appear to have life-like characteristics.

Likewise, with longer range sensor a tree (or other fixture) illuminated with such motion sensitive sensors, could respond to a passing vehicle by exhibiting a predetermined function when triggered sequentially, thereby creating a startling response.

In one embodiment, a distance based sensor controls the function of lights (or sound emanating from a decoration or motion in the decoration) depending upon how close someone or something moving gets to the sensor. For example, as a person approaches a light set, it could respond differently at varying distances. The color could change by becoming a warmer white, a deeper/brighter shade of color, shimmer, trigger a sound or actuate a motion of a further device based on proximity.

Sensors can be types currently known as photocells, ultra-sonic, PIR (passive infra-red) or types based on future technologies.

A sensor can be programmed to detect distance or motion and provide an output signal when motion or distance is detected. Multiple sensors could provide triangulation data for more sophisticated motion/presence detection.

Examples

Sound 1 is played or lights function 1 activates when someone is 5 meters from the sensor;
Sound 2 is played or lights function 2 activates when someone is 3 meters from the sensor and lights turn on;
Sound 3 is played or lights function 3 activates when someone is 2 meters from the sensor.

The effect on the user is that the lights appear to be alive/interactive and responding to the presence of a person or object.

A Doppler effective could also be illustrated in color, hue, color temperature, intensity, etc., with the light strings shifting color toward a higher/lower color frequency as the object approached and a lower/higher frequency as the object receded, creating a spectacular effect.

In addition to the above, in one embodiment, a Passive IR (PIR) sensor 86 is connectable into the light string control box 88; the PIR can be located at a distance from the box by wire or wirelessly on the control box. PIR motion detection triggers a predetermined lighting effect (can be one of several in a predetermined or random order). For example, as a person walks past the sensor the PIR detects the motion and tells the lighting controller to change function (for example, to go from steady on, to flashing, or to turn on in order to save power). PIR circuit can either send a trigger to a control box, or energize a coil on a relay or by electronic switching.

Third Embodiment

Gesture Controlled Lights and Programming Therefore

In this embodiment, gesture control sensor 86 (IR/ultrasonic/microwave/pressure sensors/other) located on an RF remote controller (or wired or built into the control box), transmits data to a main control box 88.

Hand gestures 80 include moving hands or fingers, for example, right to left, moving hand up, moving hand down, moving hand towards controller, making a pinching movement, etc. Also, a person can use body gestures such as used to control games, for example turning one's head or waving an arm.

A short cut is a pre-programmed (or pre-recorded) gesture which includes a series of actions which may be in a particular sequence. The short cut provides a short gesture pattern to control a longer or more complicated sequence of actions.

A sensor and software interpret hand gestures or body gestures and short cuts to complicated pre-configured and saved programming so that the user can "record" a sequence of gestures and create a single abbreviated movement to launch programmed series, or control lights, lighting effects, sounds, or motion/animation.

Examples of hand gesture controls:
1. pinching fingers to dim lights;
2. spreading fingers to brighten lights;
3. tapping to turn on or off;
4. flicking finger left to right or vice versa to change function;
5. moving hand towards sensor to turn on or off;
6. moving hand left to right or right to left over sensor.

The short cuts can be pre-programmed or programmed on the fly, on a PC or smart device 30 and then downloaded to the control box through its electronic address or by other input device or alternatively can be preprogrammed at the factory.

Fourth Embodiment

Adjustable White Color/White LED Lighting

As previously mentioned, LED lighting is perceived by many users as "harsh", in part because the primary color temperature of white LEDs is not a match to the warmth of incandescent bulbs. While it is possible to create a warm color LED which approximates incandescent bulbs, there are times when a bluer, more neutral white or other temperature/hue is desirable, particularly outdoors, or during daytime.

As shown in FIGS. 17-23, several solutions to achieving optimal color temperature are disclosed. LED 46 contains a warm white chip/die 48 and cool white chip/die 50 in a single enclosure. In FIGS. 21-25, a bulb 102 with a dome/diffuser 104 has two discrete white LEDs 110*a*, 110*b*, of different color temperatures adjacent each other in a lamp socket to achieve different combined color temperatures. For example, using 2 LED chips per bulb cover/mixing chamber, one warm white (for example, but not as a limitation, ~2700 k) and one cool white (for example, but not as a limitation ~10,000K) one can achieve a wide range of white color temperatures by varying the intensity/ramp rate/flash rate of one LED relative to the other.

The relative control the two adjacent LEDs can be controlled, remotely by their address, as in the previous embodiment, or by a hard wired controller in circuit with the LEDs. By turning a knob or slide a slider to make one LEDs output dominate (by any number of characteristics) over the other, the amalgamated temperature is achieved. So for example, a controller with a slider know could produce the following results. (see table below):

| Slider position | Warm White LED | Cool White LED | Resulting White Color |
|---|---|---|---|
| All the way to left | ON full | Off (or almost off) | Warm White ~2700K |
| ¼ way to right | On Full | On about ½ brightness | Less Warm, more Pure White ~3800K |
| ½ way to right | On Full | On Full | Pure White ~4500K |
| ¾ way to right | On about ½ brightness | On Full | Cooler White ~7000K |
| All the way to the right | Off (or almost off) | On Full | Cool White ~10,000K |

It will be understood that the terms warm and cool white are relative terms and that no specific color temperature is required for either though the above example is illustrative.

The LED could also be a three wire LED similar to 46, with two chips of two LEDs one reflector/printed circuit board (pcb) for blue chip and warm white phosphor and other reflector for blue chip and cool white phosphor. This will produce a wide range of colors with the minimum number of chips/LEDs.

An RGB LED can also be used. See FIGS. 19 and 23 in this embodiment, RGB electronically addressable bulbs or strings can be controlled to change warmth of white color. Cabling includes a special data line to IP control or custom addressable language.

In a further embodiment, RGB or white LED 48a, preferably a warm white LED can be used with added and RGB LED, with separate controls to the LED to create a warmer white color from the RGB bulb plus additional chips. It has been found that even though an RGB LED chipset should be able to product every color and temperature, the warmth of an incandescent light is more easily achieved by adding a white (particularly warm white) LED to the RGB output.

Users may prefer warm whites for some purposes but need other white color temperatures for others. For example, clothing which is worn in an office environment will most often be seen in color fluorescent lighting. Therefore, while a clothing store might prefer to illuminate its space with daylight or incandescent temperatures, the buyer need needs to know how the clothing will appear in real life environments. Therefore, this lighting system as previously describe may be use for lighted mirrors and other commercial lighting.

For examples, mirror/light box systems with lighting to test clothing/paint colors/wall coverings and numerous other items may require use selectable color temperatures. A mirror, such as a 3-way mirror at clothing stores can be back light to illuminate a user's clothing whether the balance of warm/cool or RGB+white LEDs can be adjusted.

Likewise, this adjustable white color system can be used in store lighting to enable the display of food, products, and other goods under the most complementary lighting to make the products more appealing to consumers to purchase them. The ability to optionally remotely control the lighting allows spaces to change instantly from season to season.

For example, if a food product appears more interesting/tasty under a particular color temperature, the product can be supplied with a lighting-upc or other code. The store operator can scan the lighting code, to approximate the food purveyors preferred lighting for sale. The system would then adjust the lighting in that region of the display (such as a refrigerator) to automatically adjust for the optimum color for that product where the food manufacturer, or other, has provide that information in a look up table associated with the code.

Fifth Embodiment

Connectable Multi-Function Lights

In order to maximize the effect of a control box on the lighting experience, it is desirable to link the box to multiple light strings and furthermore, be able to synchronize the sequencing of illumination over several strings together or simultaneously. The cost of addressable lighting is high but there are less expensive ways to achieve similar results though not as spectacular as in addressable lights.

In one embodiment, a connector is provided that allows light sets to be connected and synchronized functions from a hard wired control box. The control box may be wirelessly controlled by a smart device with an app however. Referring to light sets of connected strings, such as shown in FIG. 4. the following are examples of connector 40 locations:

Connector 40—between the control box and the first lamp holder (i.e. the output of control box);

Connector 40—after the last lamp holder in the first set. This is accomplished by providing at least two wires through the entire string circuit, power and ground, but then providing an additional wire for every function or separately controlled slave string.

A control function might be flash or color. If there are, for example 3 slave strings, then to control each slave string separately, at least 4 wires are required. One power for each slave string and one return. If the desire is to control color, such as with slave strings having RGB bulbs, then again, 4 wires are required, regardless of the number of slaves. Each wire of the three wires are connect to the R, G and B bulbs or chips on each bulb regardless of which slave string they are located on. If the desire is to have color control by slave string, then additional conductors are required, namely 4 conductors to each string, though the neutral/ground can be shared by all. So for three slave strings with RGB control separate for each string, three conductors for RGB are connected to each slave with a common return. All slave strings for all embodiments are preferably connected in a parallel configuration.

FIGS. 33-37 are helpful in understanding the following. FIG. 33 illustrates bulbs designated as 1, 2 and 3. FIG. 34 illustrates a circuit with slave strings 20 with their corresponding bulb types 1, 2, 3. In this case incandescent bulbs are shown.

In FIG. 35, LEDs are shown with a lighting pattern as shown in FIG. 36. FIG. 37 is schematic showing only the pass through of conductors from string to string for and RGB LED, with conductors R, G, B and Neutral in this example.

Examples of circuit configurations:

Type A—each bulb is wired to circuit of light strings 1, 2 and 3 (3 circuits being labeled 1, 2 and 3), the pattern would be: 1-2-3-1-2-3-1-2-3;

Type B—Clusters of Groups of x (f. ex: 10) bulbs on same circuit (for example 3 ckts: 1-1-1-1-1-1-1-1-1-1-2-2-2-2-2-2-2-2-2-2-3-3-3-3-3-3-3-3-3-3). That is a sequence of 10 bulbs on circuit 1 then 10 on circuit 2, and then 10 on circuit 3.

In another embodiment, a connector allows for color changing light sets to be connected and synchronized functions from the main control box through all connected sets so that the lights continue the pattern that the first set has and does not start over at the start of each new set.

Control Box Examples:

a) Micro controller (or other digital controller), sends data to each RGB LED to control each LED color/other function. This can be done with 2 or 3 wires. In the case of 2 wires, the IP data is sent as an RF signal over the power lines. If 3 wires, the data line is separate and use a common ground.

b) Analog controller, sends power to each circuit to control color (one power wire per LED or incandescent bulb color, for example, RGB would have 3 power wires and one return).

Using RGB LED with micro controlling chip or standard RGB bulb for analog circuits or incandescent bulbs, to connect the second light set, plug/controller is removed from second set and connected to the first set with the control box/plug connected to it (or just use a connector set that does not have the optional control box pre-attached).

Control box powers the lights in the first and second sets (and others after that):

Examples

Option 1

Control box will automatically detect (typically by polling all available addresses) the additional lights and continue the light pattern on the additional lights (not a repeating version of the first light string).

Option 2

A selector switch is set to the correct number of sets/slaves or an intelligent interface is used to poll and indicate how many sets/slaves are connected so that the program knows how to control additional sets connected to the first set. The manual selector switch could be a rotary or slide type switch, rotary preferred.

Option 3—where the remaining sets/slaves use the same circuit configurations to control each color of bulbs.

When a user connects multiple sets, there will preferably use only one plug and control box controlling the multiple connected sets using the special connectors.

Sixth Embodiment

Controller to Sequence Lights to Music or Other Input Source

In addition to detection of motion, as above, it is possible to enhance the lighting experience by providing an external stimulus for the lights, such as music or other audio input. We will refer to all inputs as "music" even if they are not, so as to simplify the discussion. FIG. 15 illustrates a sensor 86 which may be a microphone or an input for an audio feed, such as music.

In this case, rather than modulate the color/intensity/hue/color temperature, etc. of the string of lights as a whole, each bulb or string separately in response to music.

In one embodiment, RGB bulbs are connected to sound detector(s) to respond to music.

In a further embodiment, the beat of the music can cause the lights to increase in brightness using for example PNP transistor output, but a contrary outcome (i.e. decrease in brightness), can be achieved with NPN devices instead of PNP devices or vice versa. This will reverse the on and off default so that the bulbs dim instead of increase in brightness in response to the detectors.

In a further embodiment, RGB LEDs can be used to subtract rather than add colors to go from white to color shades.

In a further embodiment, FM or other wireless transmitters can be used as a remote sound trigger.

In a further embodiment, FM/Satellite receiver can be used as an audio input source.

In a further embodiment, the trigger can be based on music frequency instead of music amplitude/beat to create lights pulsing to music (for example, by having channels responsive to each, low, midrange and highs, for a total of 3 channels/outputs or more depending on how the frequencies are selected). Different light strings/slaves can be responsive to only their assigned predetermined ranges so different parts of the tree light up in response to different musical element (frequency, amplitude, beat, etc.).

In a further embodiment, an MP3 player and FM transmitter can provide the music and also include an audio output so that a passerby when viewing lights can hear the music on their own FM (or equiv.) car radio without the need to have audio output hearable by all in the neighborhood. The passerby would be instructed to tune to a particular frequency for audio. The MP3 player and FM transmitter can be both replaced by Bluetooth devices or other wireless audio devices (such as IR).

In a further embodiment, a standard light string may be connected to each output (via plug and connector) that interprets the music inputs.

Seventh Embodiment

Rotating Projection LED Light/Tree Top/Table Top Unit

FIGS. 25-28 illustrate a tree top fixture which provides a unique light dispersal.

In this case, an exemplary star shape ornament 220 is shown. The shape user definable, but the unique light output is achieved by at least one or more of the following features
  a. perforations 222 in the sidewalls of the ornament;
  b. a multifaceted transparent dome lens 240 situated between the sidewalls;
  c. projection of light, preferably RGB LED, through the dome from the underside, and
  d. rotation of the dome by a drive motor.

The ornament is constructed of at least to opposing sidewalls 242 preferably including perforations 222. The ornament attaches to an object by clamp 250. Between the spaced part walls 242 is located a rotating dome lens 240, lights 244, a drive shaft 246 and motor 248. Such a dome and drive are available from Gemmy Industries Corporation, USA Gemmy Number: 88579 also at: http://www.gemmy.com/Outdoor_Kaleidoscope_Spotlight_Multi_p/88579.htm When energized, the motor and shaft turn the lens and lights project therethrough. The sidewalls 242 block most of the emanating light so that it appears that light projects only upward from the tree top, which provides an interesting effect.

In this embodiment, a spotlight structure is combined with a ground stake to create a water proof, ground mountable version. Other mounting means may be used in addition to ground stake. Other examples are a table top unit, floor mounted unit, and a tree top mounted unit.

In one option Addressable LEDs such as described above, may be used to remotely change color and pattern (RGB or solid color LEDs) of the projector (app controlled or computer controlled, WIFI, Bluetooth®, zigby, etc.). Another embodiment includes lighting elements connected to a pre-programmed controller.

By adding stencils and/or lenses to known structure, images can be projected from the device. Motion can be simulated by turning on and off different LEDs and premade stencils can create moving images, or colors.

In a further embodiment, LEDs, of known structure can be programmed or remotely controlled from a screen or smart phone to create patterns.

Eighth Embodiment

Remote Controlled Sequencing Icicle Lights

Figure 29:
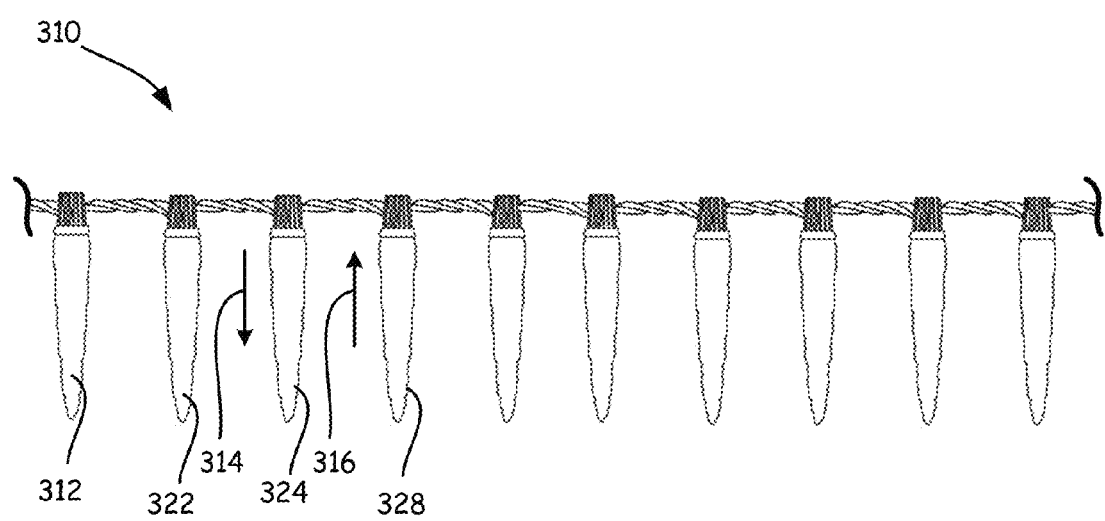
FIG. 29 is a view of a plurality of icicle light segments wired together.
Figure 29A:
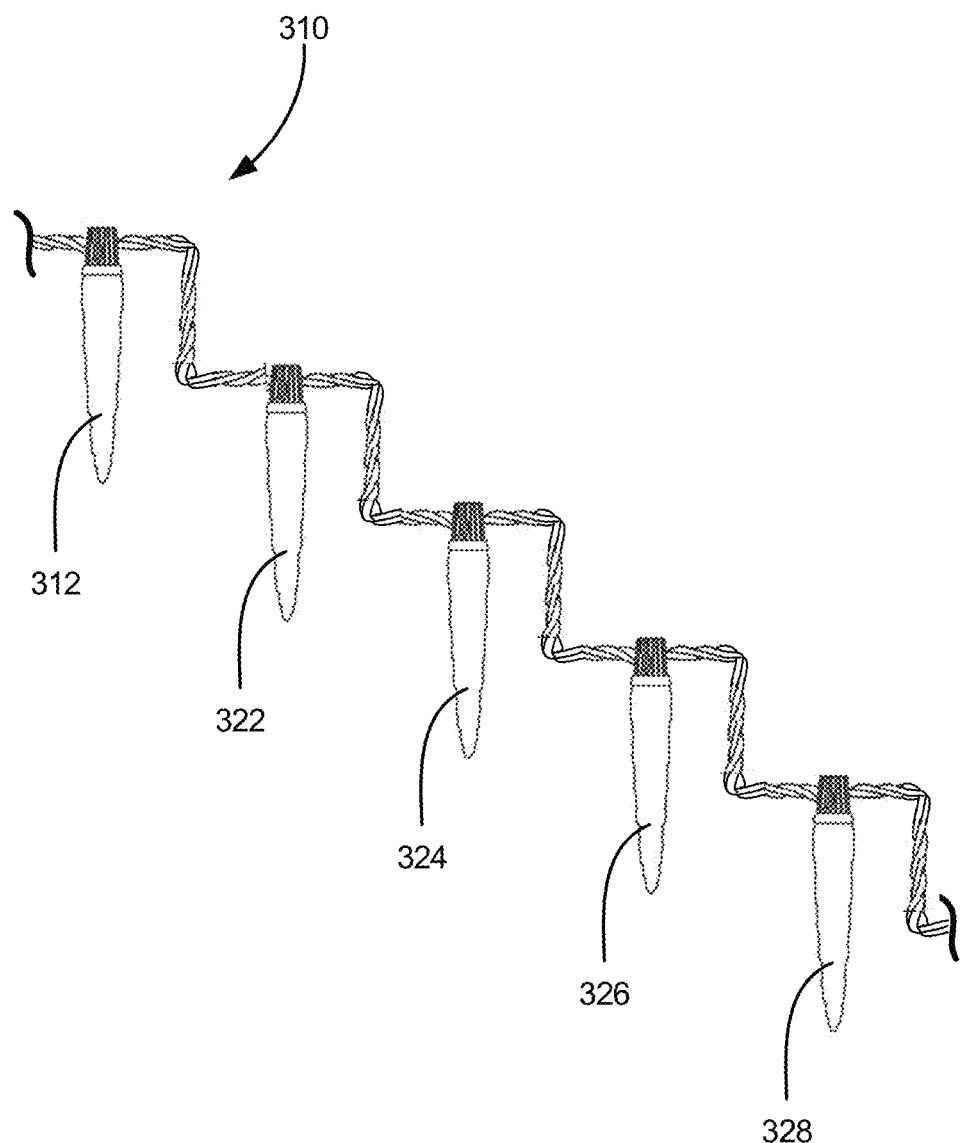
FIG. 29A is a view like FIG. 29 except that segments are downward cascading.

Icicle lights 310 are shown in FIG. 29 with a plurality of light sticks or branches 312. It is known to create "dripping" icicle lights (dripping meaning illuminating a string of bulbs sequentially from one end of the icicle to the other) or shooting stars by sequencing the string from bottom to top. Using the above disclosure, it is then possible to control the "dripping speed" (sequential illumination) of the icicle and further to allow a "drip" to run from one light segment to an adjacent light set/branch (from 322 to 324, to 326, to 328 etc.). This effect is further enhanced if the icicle segments are arranged vertically sequentially rather than horizontally sequentially as shown. In a further embodiment, a remote controller is used to control the "dripping speed" of icicle light strings and in alternative, reversing of drip (upward).

In a further embodiment, the remote control (smart phone or LCD screen) displays the entire lighting set up with all icicle lights shown. Each branch/drip of each light string is controllable or addressable, so the user can create a sequence drip from one icicle light branch to the next (lower) branch.

In a further embodiment, the remote control sets the dripping speed and reverse illumination from normally off to normally on and turn off LEDs (vs. turn on) to create dripping motion.

Ninth Embodiment

Wireless Ornaments

Figure 30:
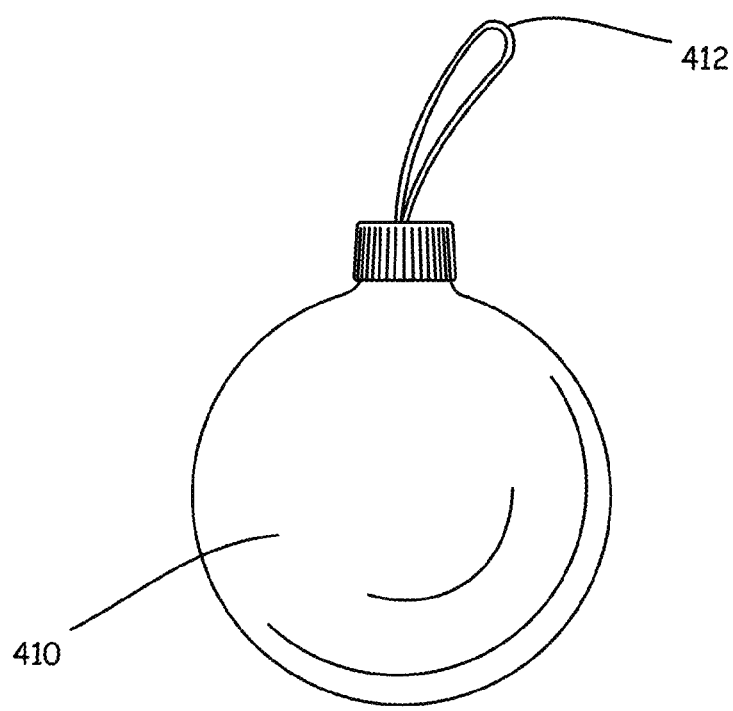
FIG. 30 is a view of a hanging ornament.
Figure 31:
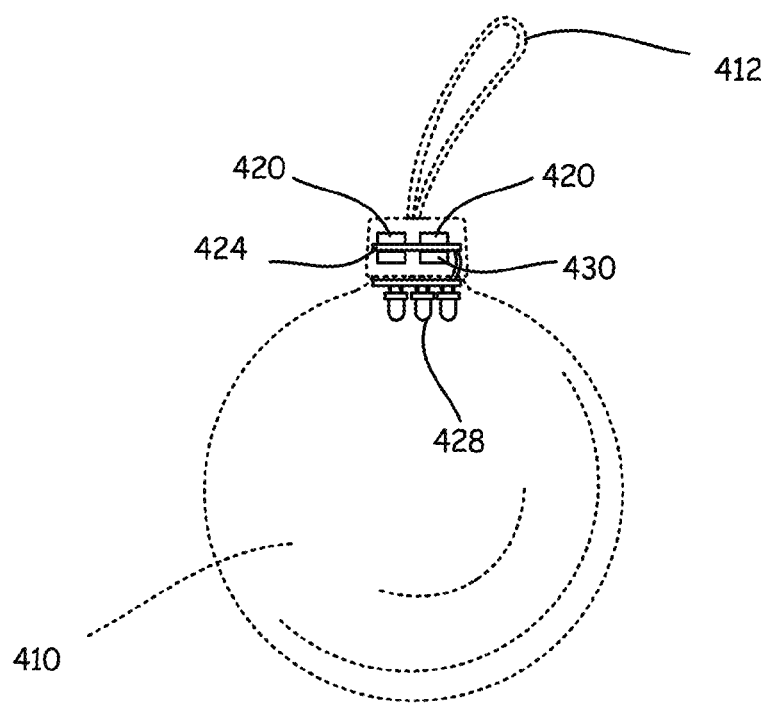
FIG. 31 is a view of the ornament in FIG. 30 with portions of the globe broken away.

Illuminated or moving holiday ornaments typically require both an external power source and external control. The ornaments in FIGS. 30-31 do not require either. Ornament 410 is typically suspended from a tree by loop 412. In this embodiment, the ornament is entirely wireless without an independent power. Thus it must include a battery 420 or receive EMF power from an external source transmitted to a coil or antenna. Loop 412 may double as the coil/antenna.

To operate the effect (motion or light) of the ornament, a microprocessor chip 424 and other control circuits are provide within the shell of the ornament globe. Likewise, one or more LEDs 428 for illumination are provided on the PCB which is within the globe.

Even so, it would it would be desirable to tell them to turn off, i.e. "enter sleep mode" and then recover with little power usage.

It is presently still difficult to supply large amounts of EMF power at long distances, but short bursts are practical. So while the ornament may have its own battery power for illumination, it may use an EMF switch to go into wake/sleep mode to conserve power when not in use (such as at late night times). EMF, even at low power, can also be used to recharge the onboard batteries 420, even if this takes many hours during the ornament's sleep cycle.

By providing each ornament with an EMF receiver 430, with an induction coil 412, and providing a controllable source of EMF, such as low frequency AC fields, the ornament can be controlled without a radio receiver which may require complex parts and high current drain. Instead, a burst of coded or frequency tuned EMF to the receive 430 can turn off control or wake up a battery powered ornament.

In this embodiment, lights or ornaments are wirelessly controlled (WIFI, Bluetooth®, zigbe, etc.) to turn each on and off under the control of an app, or PC, or tablet, to create patterns or flashing, or on/off modes.

In a further embodiment, the system may sense an EMF field to turn on or off the battery powered item, to save power at night.

For example, a battery powered light/ornament will go to "sleep" if it does not receive a signal within a predetermined period of time, but will check status for this signal from time to time. If the signal is EMF, once voltage is detected, the unit would operate for a fixed period of time or until the EMF induced power is removed.

In a further embodiment, same as above, except instead of going to sleep the color or pattern can be changed.

In a further embodiment, the ornaments can be made of organic LED (OLED) so that it has a uniform illuminance/glow.

In a further embodiment, an ornament can include phosphor to outside of ornament (or inside of outer shell, or molded into the outer shell) to provide a radiant glow around the ornament.

The ornament system may also use a radio signal, such as RFID or other near field technology to change the color, state, or function or sound of one ornament when another ornament is placed next to it or tapped against it.

In another embodiment, ornaments with RFID or other signal may be used to change the color, state, or function or sound of a light string when the ornament is placed near the control box.

Tenth Embodiment

Color Copying

With lights which are color controllable, such as described herein, it may be desired to match a particular color such as a wall color, painting, wall paper, another lamp, etc.

Figure 32:
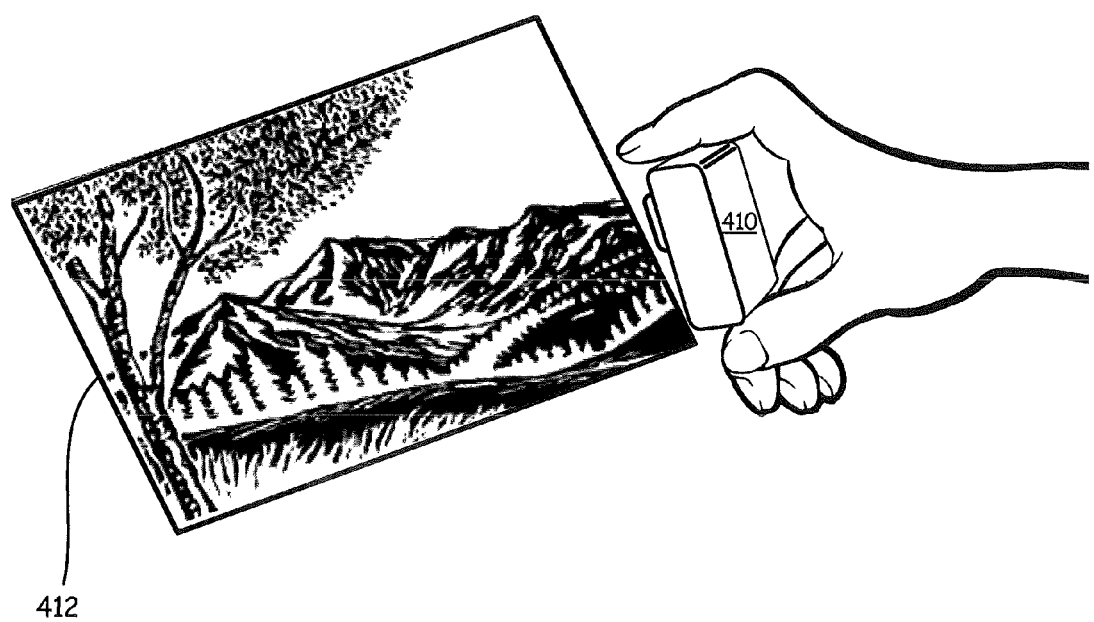
FIG. 32 is a perspective view of a camera image capture device and a picture being captured.
Figure 32A:
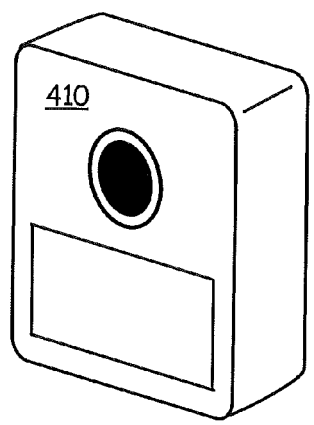
FIG. 32A is a front perspective view of a camera capture device.

In FIGS. 32-32A, a color sensor 410, such as a digital camera or smart phone device, is used to determine the color of an object of which it is sensing and transmit that color information to addressable lights. For example, is a user's interior wall color is beige and the user wants their lighting to conform to that color (or complement that color), the sensor can measure the color, determine its value (such as RGB components) and transmit that same color to the light string or addressable bulb. A preprogrammed system may provide complementary colors as an alternative to a direct match of the sensed color. The sensor can be part of a camera in a smartphone or a standalone sensor built into or remote from the lighting string.

If the object measured has multiple colors, such as painting 412, the app software which receives the color image, may 1) determine the dominate color and use only that color, 2) average the colors detected and compute an amalgamated color, or 3) offer the user color zones (zones on the image of select colors) and let the user select the preferred color. The color is then transmitted to the app as a custom color for one or more of the lights in a string. If effect, it identifies the location on the color pallet (FIG. 8).

The description of the disclosure and its applications as set forth herein is illustrative and is not intended to limit the scope of the disclosure. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the disclosure.

The invention claimed is:

1. A system for configuring the display of lights in a lights string comprising:
   a. a plurality of lamps wired into a slave string of lights;
   b. said slave string having at least one address and a processor controller for responding to commands sent to that address;
   c. a controller connected to said slave string to provide power and address signals to said slave string;
   d. a device connected to said controller for transmitting the commands to said controller;
   e. said device including a display screen and running software including:
      i. a display including a visual indication said slave string and the count of the lamps connected;
      ii. a touch responsive interface for accessing each of said displayed slave string;
      iii. in response to access of a displayed slave string, displaying a color pallet for assigning a color to said slave string;
      iv. a transmitter for transmitting said assigned color from said device to said controller and to said slave string by address;
      v. in response to access of a displayed slave string, displaying a selection of non-color light display characteristics assignable to said slave string;
      vi. a transmitter for transmitting said selected display characteristics from said device to said controller and to said slave string by address,
   so that when said slave string are illuminated, said slave string will display whatever color and non color characteristics have been transmitted to them from said device; and wherein said system further includes motion sensing controls on said device for hands free control of said slave string.

2. The system of claim 1 wherein said motion sensing controls include motions drawing from the group of:
   a. pinching fingers to dim lights;
   b. spreading fingers to brighten lights;
   c. tapping to turn on or off;
   d. flicking finger left to right or vice versa to change function;
   e. moving hand towards sensor to turn on or off; and
   f. moving hand left to right or right to left over sensor.

3. The system of claim 2 further including an input in said controller for audio files, and wherein said color and/or non-color characteristics of said lamps are modulated in response to said audio file.

4. The system of claim 2 wherein said slave string includes individual addressable bulbs and wherein color and non-color characteristics of each bulb may be selected, displayed and transmitted to the bulbs.

5. The system of claim 2 wherein the non-color characteristics are selected from the group of flashing, fading, and jumping.

6. The system according to claim 2 wherein said assigned color is saved to a color matrix display screen capable of saving multiple colors and wherein a color matrix screen includes a non-color transitional characteristic selector which allows a user selectable input to select a non color characteristic to transition from each indicated on the color matrix display; so that when the colors and non-color characteristics are selected and transmitted to the address slave strings, they will display a sequence of previously saved colors and non-color transition characteristics between colors.

7. The system of claim 1 wherein said device is configured to save a plurality of color matrices and non color transitional characteristics wherein a user can and select from said saved color matrices to be transmitted to said controller.

8. The system of claim 1 including a plurality preprogrammed color and non color characteristics are stored on the device for user selection.

9. A system for configuring the display of lights in a lights string comprising:
   a. a plurality of lamps wired into a slave string of lights;
   b. each of said slave string having at least one address and a processor controller for responding to commands sent to that address;
   c. a controller connected to said slave string to provide power and address signals to the slave string;
   d. a device wirelessly connected to said controller for transmitting commands to said controller;
   e. said device including a display screen and running software including:
      i. a display including a visual indication said slave string and the count of the lamps connected;
      ii. a touch responsive interface for accessing each of said displayed slave string;
      iii. in response to access of a displayed slave strings, displaying a color pallet for assigning a color to said slave string;
      iv. a transmitter for transmitting said assigned color from said device to said controller and to said slave string by address;
      v. in response to access of a displayed slave string, displaying a selection of non-color light display characteristics assignable to said slave string;
      vi. a transmitter for transmitting said selected display characteristics from said device to said controller and to said slave string by address,
      vii. wherein the display includes a virtual presentation of lamps corresponding to lamps on said slave strings and wherein said selected color and non-color characteristics are virtually displayed on said display screen before transmission to said controller;
   so that when said slave string of lights are illuminated, they will display whatever color and non-color characteristics have been transmitted to them from said device.

10. The system of claim 9 further including a plurality of light strings; a receiver in said display screen for receiving polling information from said controller to determine which slave strings have reachable addresses.

11. A system for configuring the display of lights in a lights string comprising:
   a. a plurality of lamps wired into a slave string of lights;
   b. said slave string having at least one address and a processor controller for responding to commands sent to that address;
   c. a controller connected to said slave string to provide power and address signals to the slave string;
   d. a device connected to said controller for transmitting commands to said controller;

e. said device including a display screen and running software including:
  i. a display including a visual indication said slave string and the count of the lamps connected;
  ii. a touch responsive interface for accessing each of said displayed slave string;
  iii. in response to access of a displayed slave strings, displaying a color pallet for assigning a color to said slave string;
  iv. a transmitter for transmitting said assigned color from said device to said controller and to said slave string by address;
  v. in response to access of a displayed slave string, displaying a selection of non-color light display characteristics assignable to said slave string;
  vi. a transmitter for transmitting said selected display characteristics from said device to said controller and to said slave string by address,
  vii. further including a function to replicating the color and non-color characteristics of one slave string to another slave string.

* * * * *